ROTATING DISK AMUSEMENT DEVICE

Filed Oct. 25, 1950 14 Sheets-Sheet 1

Inventor
JAMES FIORINO
By John N. Randolph
Attorney

Inventor
JAMES FIORINO
By John N. Randolph
Attorney

Nov. 5, 1957 J. FIORINO 2,812,182

ROTATING DISK AMUSEMENT DEVICE

Filed Oct. 25, 1950 14 Sheets-Sheet 3

Inventor

JAMES FIORINO

By John N. Randolph

Attorney

Nov. 5, 1957 J. FIORINO 2,812,182

ROTATING DISK AMUSEMENT DEVICE

Filed Oct. 25, 1950 14 Sheets-Sheet 4

Inventor

JAMES FIORINO

By John N. Randolph

Attorney

INVENTOR
JAMES FIORINO
By John N. Randolph
Attorney

Nov. 5, 1957 J. FIORINO 2,812,182

ROTATING DISK AMUSEMENT DEVICE

Filed Oct. 25, 1950 14 Sheets-Sheet 6

Inventor

JAMES FIORINO

By John N. Randolph

Attorney

Nov. 5, 1957 J. FIORINO 2,812,182

ROTATING DISK AMUSEMENT DEVICE

Filed Oct. 25, 1950 14 Sheets-Sheet 7

Inventor

JAMES FIORINO

By John N. Randolph

Attorney

ROTATING DISK AMUSEMENT DEVICE

Filed Oct. 25, 1950 14 Sheets-Sheet 8

INVENTOR

JAMES FIORINO

By John N. Randolph

Attorney

Inventor
JAMES FIORINO
By John N. Randolph
Attorney

ROTATING DISK AMUSEMENT DEVICE

Inventor

JAMES FIORINO

By John N. Randolph

Attorney

ROTATING DISK AMUSEMENT DEVICE

Filed Oct. 25, 1950 14 Sheets-Sheet 11

Inventor

JAMES FIORINO

By John N. Randolph

Attorney

JAMES FIORINO

By John N. Randolph

Attorney

ROTATING DISK AMUSEMENT DEVICE

Filed Oct. 25, 1950 14 Sheets-Sheet 13

JAMES FIORINO

By John N. Randolph

Attorney

Nov. 5, 1957 J. FIORINO 2,812,182

ROTATING DISK AMUSEMENT DEVICE

Filed Oct. 25, 1950 14 Sheets-Sheet 14

INVENTOR

JAMES FIORINO

By John N. Randolph

Attorney

United States Patent Office 2,812,182

Patented Nov. 5, 1957

2,812,182

ROTATING DISK AMUSEMENT DEVICE

James Fiorino, Du Quoin, Ill.

Application October 25, 1950, Serial No. 192,113

18 Claims. (Cl. 273—143)

The present invention relates generally to amusement devices and more particularly to game devices or machines which depend entirely upon chance for the successful operation thereof.

More specifically, the present invention contemplates as an important feature thereof the provision of an electro-mechanical amusement device of the aforedescribed character which fully simulates the various plays or operations of the well know dice or crap game. To this end, the present invention according to the best mode thus far devised for practicing the principle thereof comprises a pair of reels or cylinders mounted side by side for free rotary movement and each having a plurality of different dice symbols or numerals arranged in random fashion about the periphery thereof. The reels and the dice indicia appearing thereon thus simulate a pair of dice, and rotary motion or roll of the reels thus simulates the roll of the dice.

Means including a handle, manipulatable by the player when a playing piece is deposited into the machine, are employed to impart rotary motion to the reels upon actuation of the handle. Means are also employed for individually stopping the reels in predetermined time delayed sequential order at the termination of limited intervals of free rotation. Each reel is provided with a plurality of different rotational stop positions, there being a stop position for each dice symbol thereon in which the symbol, and the corresponding symbol of the other reel, appear adjacent a reference mark whereby the sum of these dice symbols or numerals gives a combination point or number such, for example, as 7, 11, 4, 5, 6, 8, 9 or 10, as in the reel dice game.

Circuit means including switch mechanisms constructed and arranged to be selectively responsive to the various stop positions of the reels and individual thereto are employed to electrically add the numerals separately indicated thereby to close a circuit having a number corresponding to the dice combination or point number as displayed collectively by the reels at the aforementioned reference mark. When the dice reels stop on combinations 7 or 11, the aforementioned circuit which is caused to be closed thereby additionally accomplishes the closing of another circuit constituting a part of an electrical dispensing unit. When the reels stop on any one of combinations 4, 5, 6, 8, 9 or 10, the circuit closed thereby causes a number corresponding thereto to be recorded on the machine together with a number which indicates the number of playing pieces deposited in the machine, the last named number being illuminated as the point comes up and the recorded point number being illuminated during the succeeding roll in trying for the point. The player can now keep rolling the reels by pushing the handle over and over until he either makes his point, or rolls point number 7, without the machine relocking. When he makes his point, the circuit of the electrical dispensing unit, aforementioned, is energized.

The invention contemplates as a further feature thereof the provision of an amusement device of the aforedescribed character which is constructed and arranged to simulate the so called "pass line" and the "do come" plays, as in the real dice game, and wherein the player if he so chooses may make deposits into the machine between each roll of the reels. Stated in other words, the device of the present invention has provision for handling one or all of the points, combinations or numbers 4, 5, 6, 8, 9 and 10 with provision for actuating the dispensing mechanism on each of these points as the point is made and until the dice reels roll up point 7. Also, in the event that a play has been made on a particular point just prior to the turning up of that point on the machine, the dispensing mechanism of the machine will be actuated and immediately thereafter will set the point up again on the device, i. e., will record the point together with the number corresponding to the number of plays which had been made on that point.

It is therefore an important object of the present invention to provide an electro-mechanical amusement device which simulates various plays of the well known dice or crap game and produces a visual recording thereof.

Another object resides in the provision of an amusement device of this character which may be set to require deposit of a single playing piece to release the locking mechanism of the device and may be set to cause actuation of the dispensing mechanism on the various plays or operations of the machine.

Another object is to provide electro-mechanical means for visually and selectively indicating and recording the indicia means corresponding to predetermined rotational positions in which a pair of free rotary members may chance to stop.

Another object is to provide an electro-mechanical device for electrically adding numbers corresponding to the rotational positions in which a pair of free rotary members may chance to stop. A still further object is to provide an electrical adding device of the aforedescribed character which also has further provisions for effecting a circuit function having a number corresponding to the sum of the numbers indicating the rotational stop positions of the free rotary members.

Still other objects, features and advantages of the present invention, other than those expressly set forth hereinbefore, are inherent in or implied from the novel combination, construction, and arrangement of the parts and circuit components in a manner to produce the many useful results to which the invention is directed in whole and in part.

In the accompanying drawings wherein the same reference characters have been employed to designate the same or similar parts throughout the several views thereof;

Figure 22:
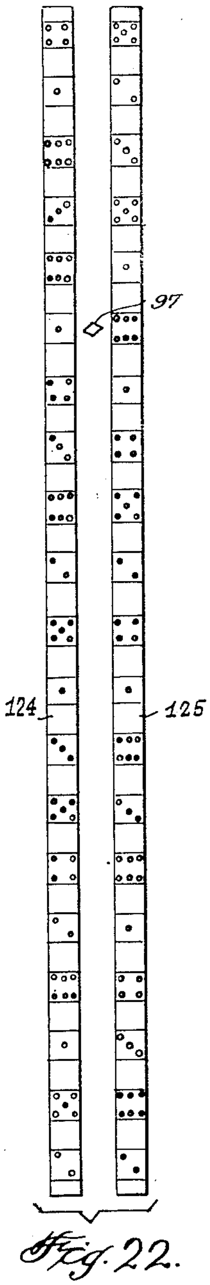
Figure 10:
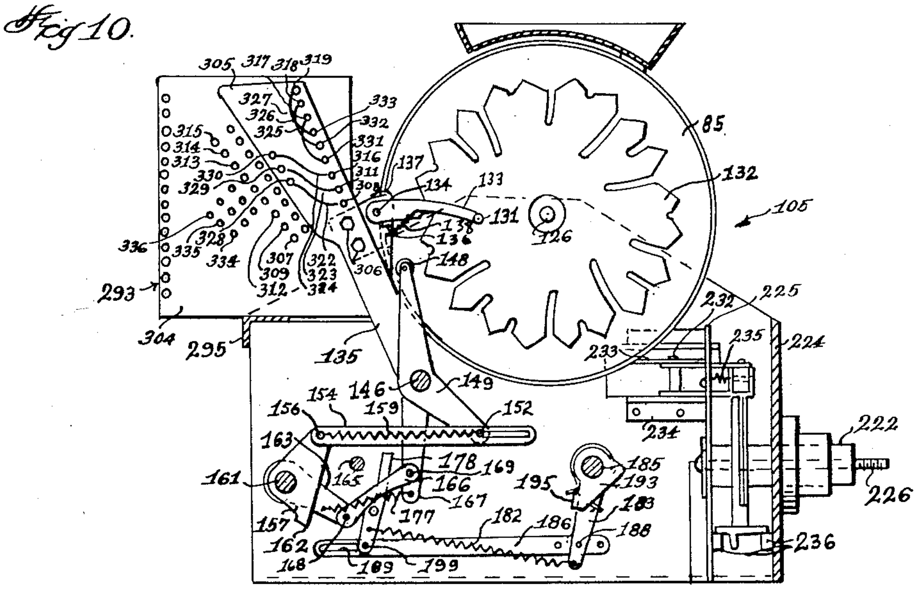
Figure 10 is a sectional view of the reel mechanism taken substantially along the line 10—10 of Figure 6.
Figure 21A:
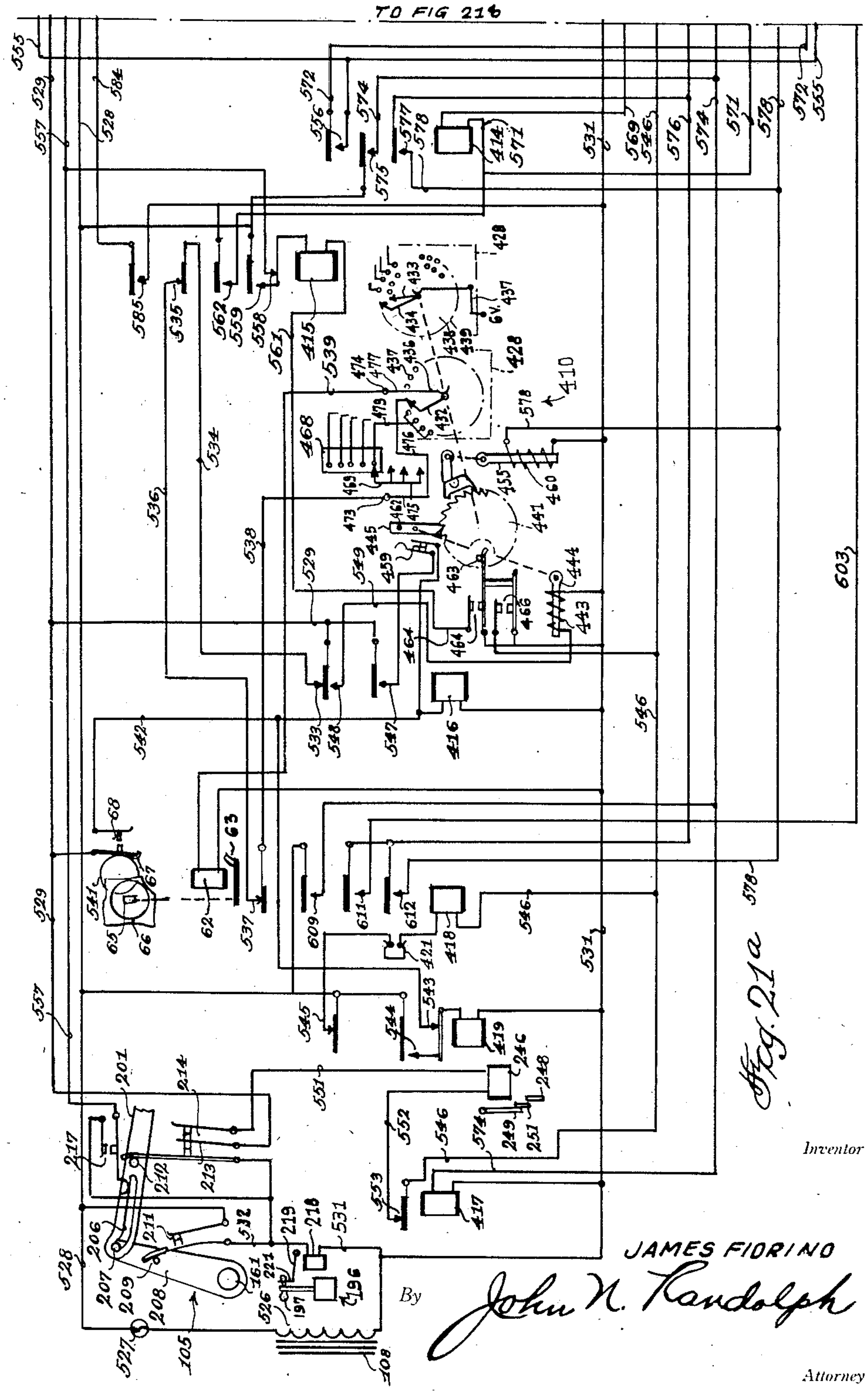
Figure 21B:
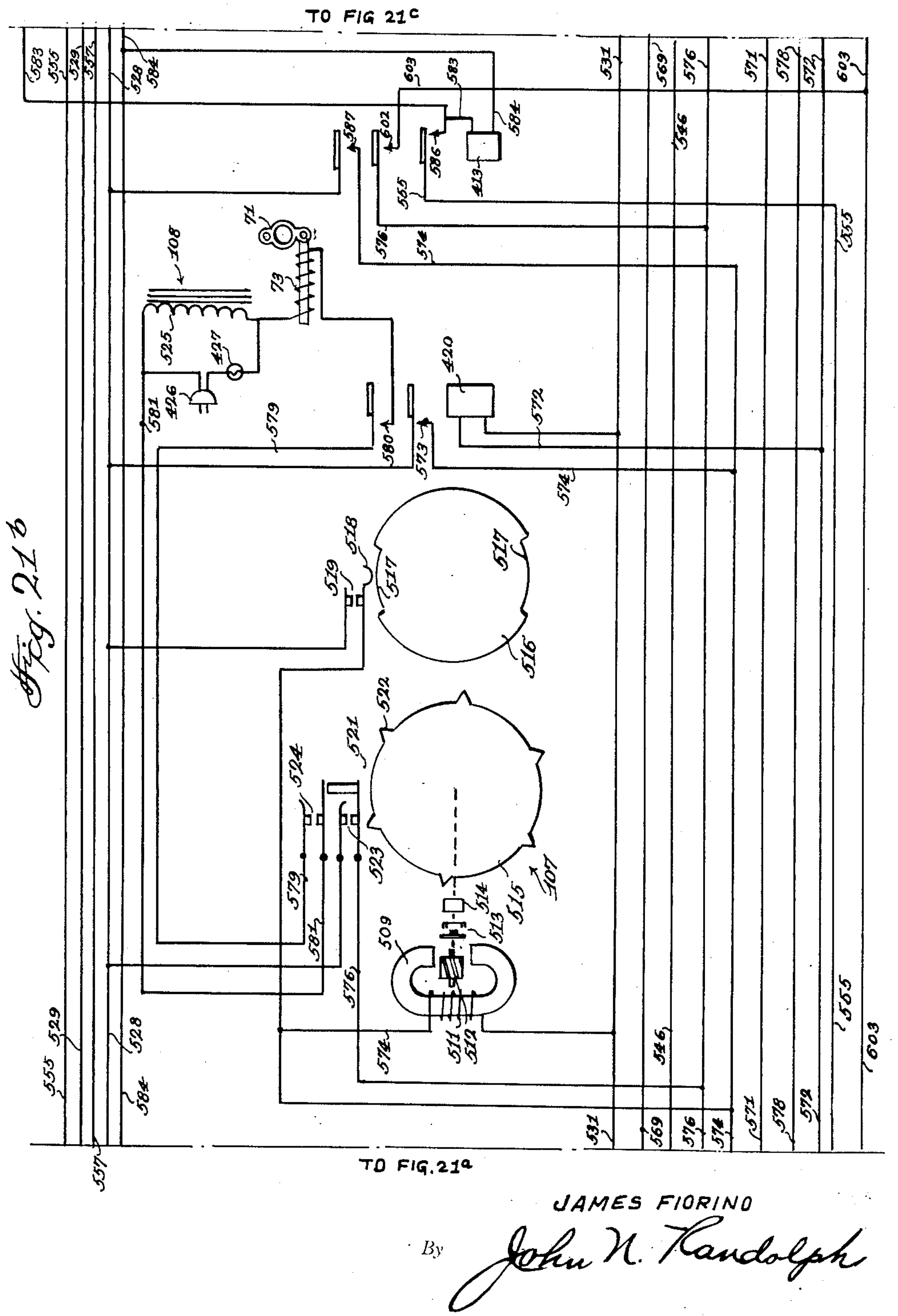
Figure 21C:
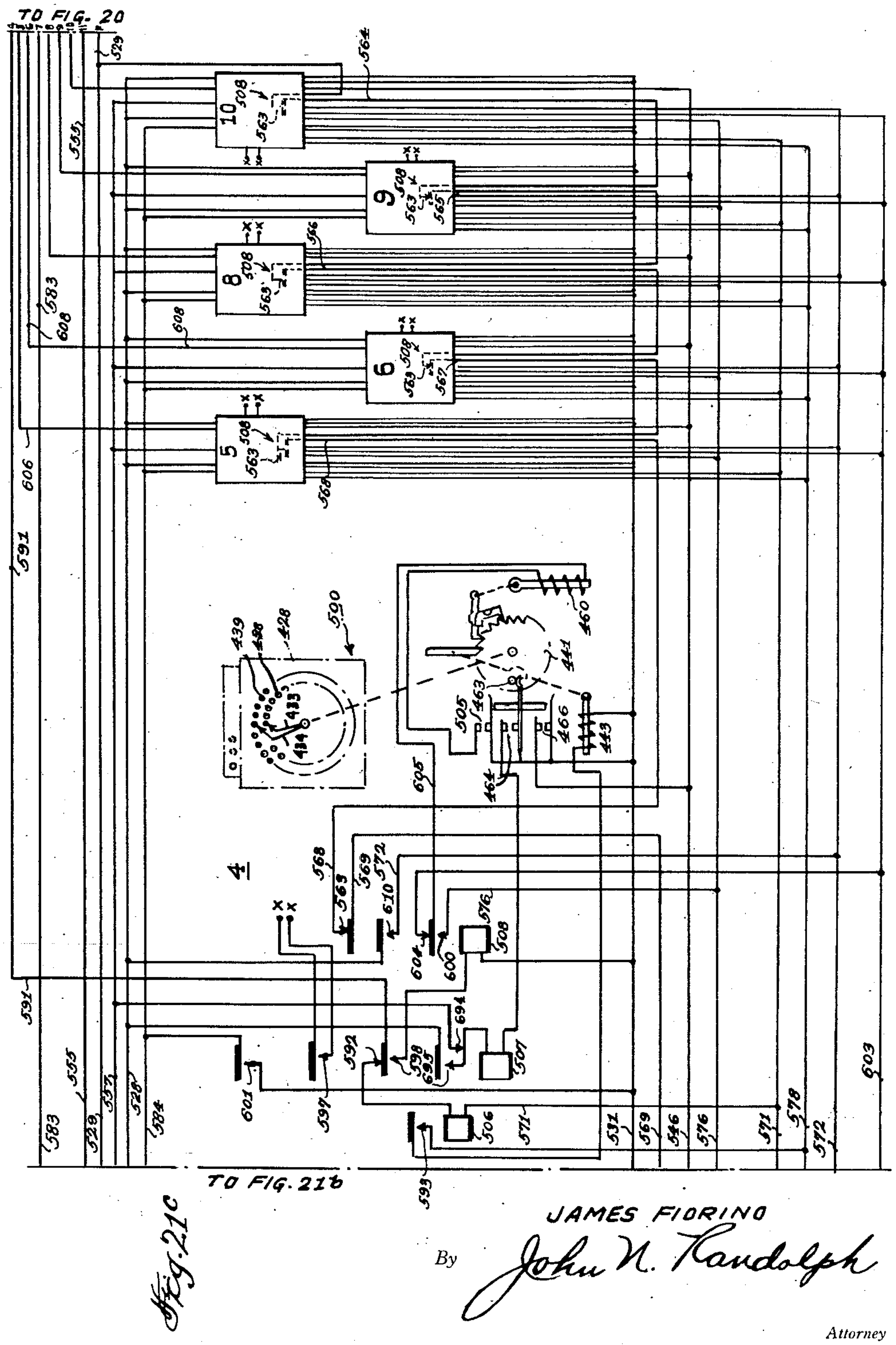

Figures 21*a*, 21*b* and 21*c*, illustrate in diagrammatic form the complete electrical system of the present invention except for certain electrical diagrams which are illustrated in other views to which reference is directed by legends appearing on Figures 21*a*, 21*b* and 21*c*;

Figure 22 is a plan view of a pair of dice indicia bearing members which are illustrated in side by side relation and with respect to the point indicating reference mark, the members being developed to full length to illustrate the random arrangement of the dice indicia characters appearing thereon.

Figure 23:
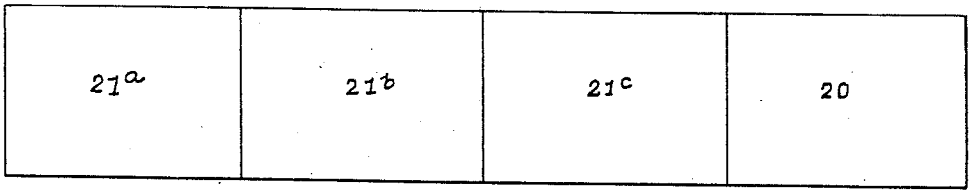
Figure 24:
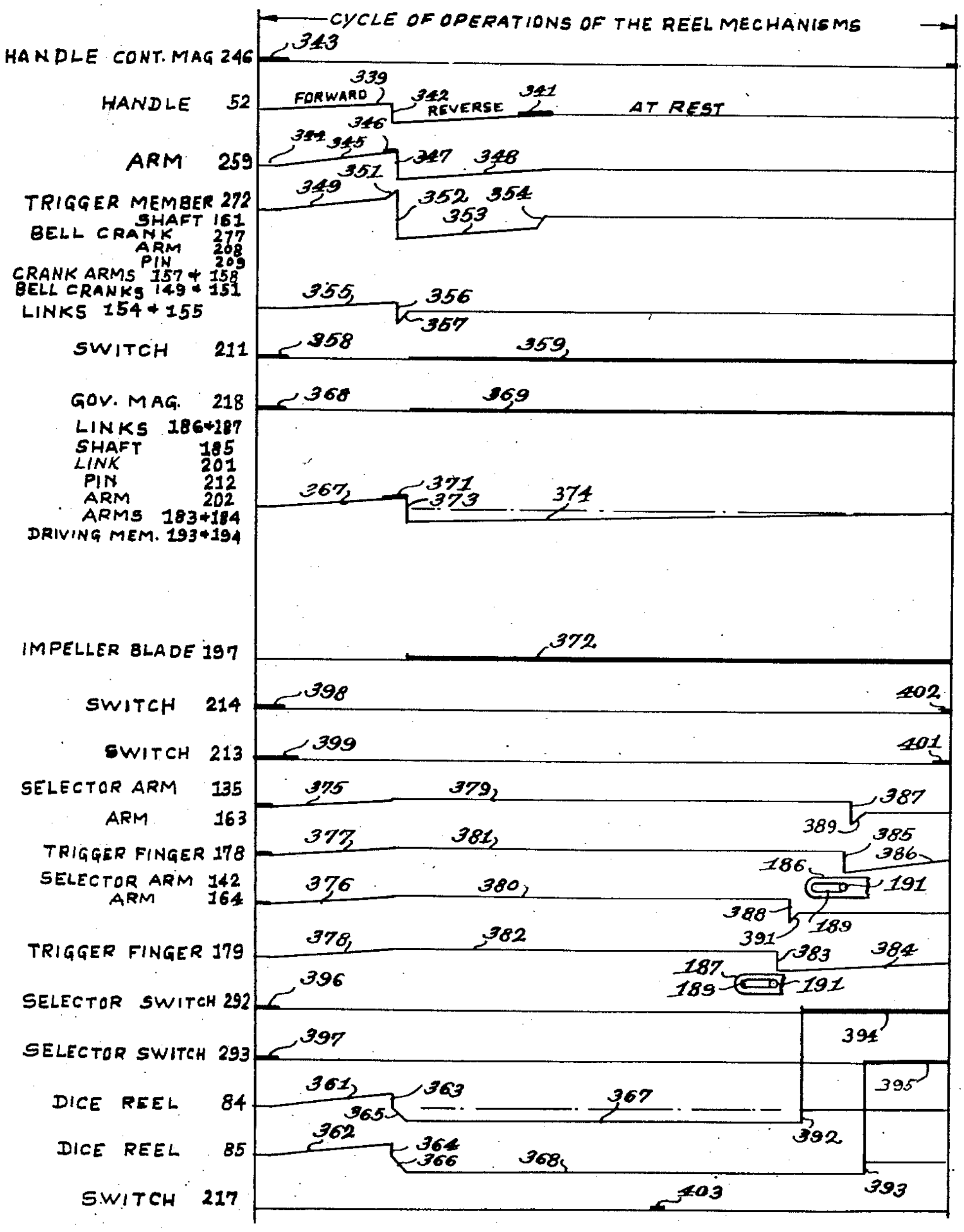

Figure 23 is a chart illustrating the arrangement of the sheets on which Figures 20 and 21*a*, 21*b* and 21*c* appear; and Figure 24 is a timing chart illustrating a complete cycle of operations of the reel mechanism.

Referring now to the drawings for a more complete understanding of the invention, the reference numeral 50 generally designates the amusement device which, as may be seen, is of a console-type having a cabinet 51 on the front of which is located an operating handle 52, a playing piece receiving slot 53, and a playing piece control panel 54.

The panel 54 has the usual rejection slot 55 and the dispensing slot 56, a defective playing piece, for example, being returned by way of the slot 55 upon manipulation of the button 57 in the usual manner. The panel 54 is removable from the cabinet 51 and is key-locked thereto as at 58, all in a well known manner.

On the back of the panel 54 is mounted a control mechanism generally designated 60 and comprising a playing piece receiver 59 into which a playing piece deposited in slot 53 passes by way of chute 61. The control mechanism also comprises an electromagnet 62 which must be energized when the amusement device is about to be put into operation. A link 63 interconnects the armature of the magnet 62 with means in the receiver 59, not shown, for causing a playing piece received into the receiver when the magnet 62 is de-energized to pass by way of the chute 64 and outwardly of the rejector slot 55. When magnet 62 is energized, a finger 65 carried by the armature thereof extends into an opening 66 whereby a playing piece received by the receiver 59 is caused to pass between the finger 65 and the actuating leaf 67 of a control switch 68. As the playing piece engages leaf 67 it momentarily closes switch 68 and then passes by way of chute 69 into the stack or tube 71. An overflow of playing pieces collected in tube 71 passes onto and down a trough 72 into a suitable collecting box or receptacle 70. Each time a solenoid 73 is energized a dispensing from the tube 71 may be accomplished, the solenoid, for this purpose, being connected to a slide 74 which is withdrawn thereby to effect a discharge from the tube 71. The slide is formed of two layers or parts so that one part may be removed and only one part used when it is desired to reduce the rate of discharge from the machine. Dispensings are made from the machine through the chute 75 and slot 56 at the front of the panel 54.

The top cover or panel 76 is hingedly connected to the cabinet as at 77 and locked in closed position thereon from the inside as by the latch means 78. The cover 76 is formed with an opening 79 which is closed by a pane of glass 81 or other suitable transparent or translucent material. Except for the circular areas 82 upon which the numerals 1 through 9 and 10, 20, 30 and 40 appear as by being painted, engraved, or otherwise suitably formed thereon, and except for the square area 83 through which the dice reels 84 and 85 appear, the pane 81 is suitably prevented from passing light therethrough as by painting the pane or otherwise suitably masking the light therefrom. Light for illuminating the numerals in the circular areas 82 is supplied by a bank of lights 86 individual to the numerals and supported on the sub-panel 87 secured to the underside of the cover 76. These numerals, when illuminated, indicate the number of plays made on the machine prior to each rotation of the reels.

A substantially upright panel 88 is mounted on the back portion of the cover 76. Panel 88 has an opening 89 which is closed by a pane of glass or other transparent material 91 generally in the same manner as the opening 79 in cover 76. The window glass area 89 displays six square areas 92 and each square area 92 has arranged thereabout a plurality of small circular areas 93.

Numerals appearing in the circular areas 82 appear in the circular areas 93, and these numerals as well as the larger numerals 4, 5, 6, 8, 9 and 10 are formed on pane 91 in the same manner in which the numerals are formed on the pane 81, as aforedescribed, whereby each numeral is illuminated when a lamp individual thereto is lighted. These lamps 94 are mounted on a panel 95 therefor which is secured in any suitable manner to the upright panel 88 in appropriate spaced relation behind the pane 91.

Figure 2:
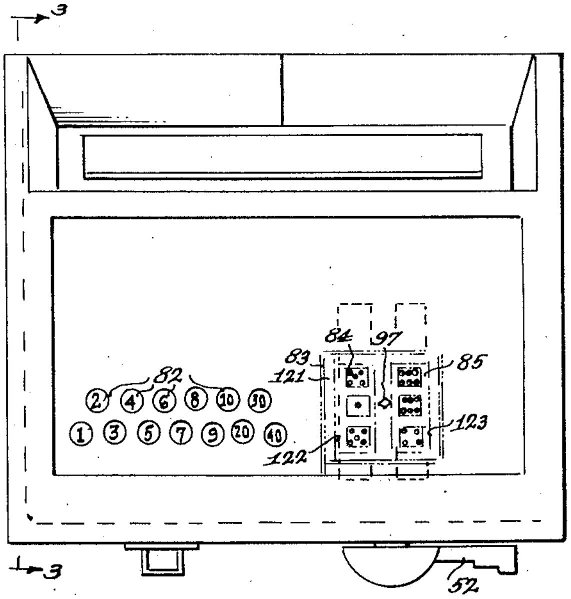
Figure 2 is a top plan view of the amusement device.

The window display area 91 preferably is divided into six equal areas individual to the large numerals as by the grid lines 96 which may be marked on the pane 91 in any suitable manner. The large numerals in the square areas 92 when illuminated, individually indicate the point number which was previously displayed on the dice reels 84 and 85, the point number being the sum of the dice symbols or numerals disposed on either side of the reference mark 97 (Figures 2 and 22).

As will appear more fully hereinafter, when the dice reels come to a stop on a particular point number such, for example, as 4, the illuminated numeral in the circular area 82 indicating the number of plays made on that rotation of the dice reels is extinguished and the corresponding number is caused to be lighted adjacent the point numeral 4. The numeral 4, however, does not become lighted until after the dice reels are again set into motion. The recording of the number of plays on each roll is thus transferred and into indicating and recorded relation with respect to the point numbers to be played.

The back of upright panel 88 is closed by the removable plate 98 which is securely key-locked into position as at 99. Similarly, a back removable plate 101 is provided for closing the back of cabinet 51 and is securely key-locked thereto as at 102.

On the inside of cabinet 51 there is provided an upper shelf 103 and a lower shelf 104. On the upper shelf is mounted the reel mechanism generally designated 105 and the playing piece counter assembly unit generally designated 106. On the lower shelf 104 is mounted the motor and cam assembly generally designated 107, the power transformer 108, and the six point counter assembly units designated respectively by their corresponding point numbers.

Figures 3, 4, 5:
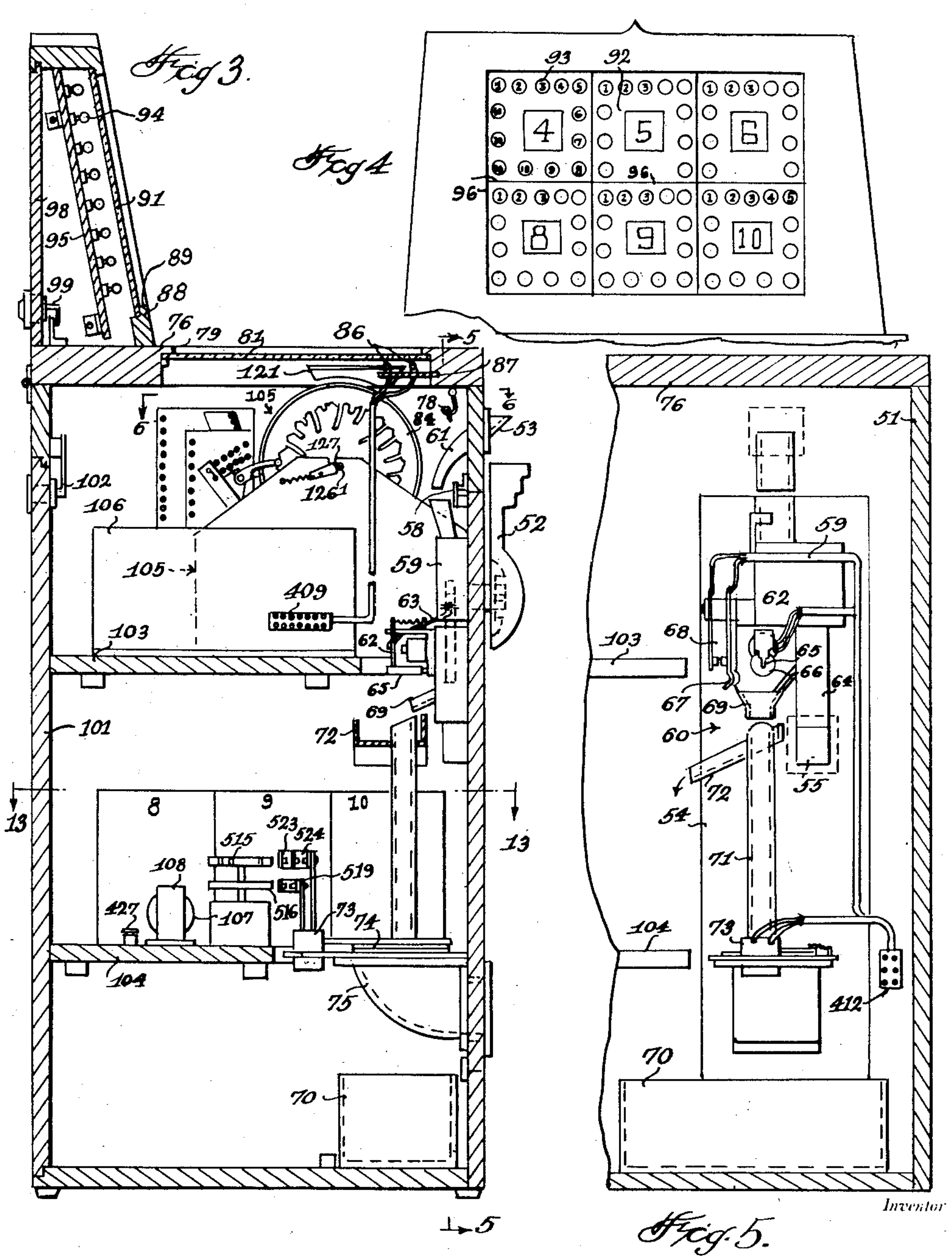
Figure 3 is a vertical sectional view of the device as seen along the line 3—3 of Figure 2.
Figure 4 is a front elevational view of the points recording panel per se.
Figure 5 is a fragmentary sectional view of the device taken along the line 5—5 of Figure 3 and illustrating the back of the playing piece control mechanism.

Reel mechanism 105 comprises a pair of spaced frame members 109 and 111 having bottom flanges 112 and 113, respectively, by means of which the reel mechanism may be secured to the top shelf 103 in any suitable manner. Frame members 109 and 111 also have upper portions to which are secured L-shaped brackets 114 and 115 by suitable fastening means 116. Brackets 114 and 115, in turn, have secured thereto a pair of brackets 117 and 118, respectively, by suitable fastening means 119. Brackets 117 and 118 support therebetween a frame 121 which, as best may be seen in Figure 3, has the upper surface thereof disposed just subjacently to the pane 81 of the cover or table top 76. Frame 121 which is somewhat funnel-shaped, is arranged generally in registering alignment with the opening 79 in the cover 76.

Frame 121 has a pair of spaced parallel slots 122 and 123 formed therein through which appear portions of the dice reels 84 and 85 respectively. Intermediate these openings in frame 121 is a frame portion upon which is arranged or otherwise formed the reference mark 97 aforementioned. Each of the reels 84 and 85 has secured thereto and arranged about the periphery thereof a strip of paper, cardboard, or the like upon which is printed, painted, or otherwise suitably formed, a plurality of dice symbols which are spaced equally along the length thereof but arranged in random fashion with respect to the appearance or order of the dice numerals, i. e., there is no definite pattern, order, or sequence in which the dice symbols appear on either of the strips 124 and 125 which are individual to reels 84 and 85 respectively.

Figure 7:
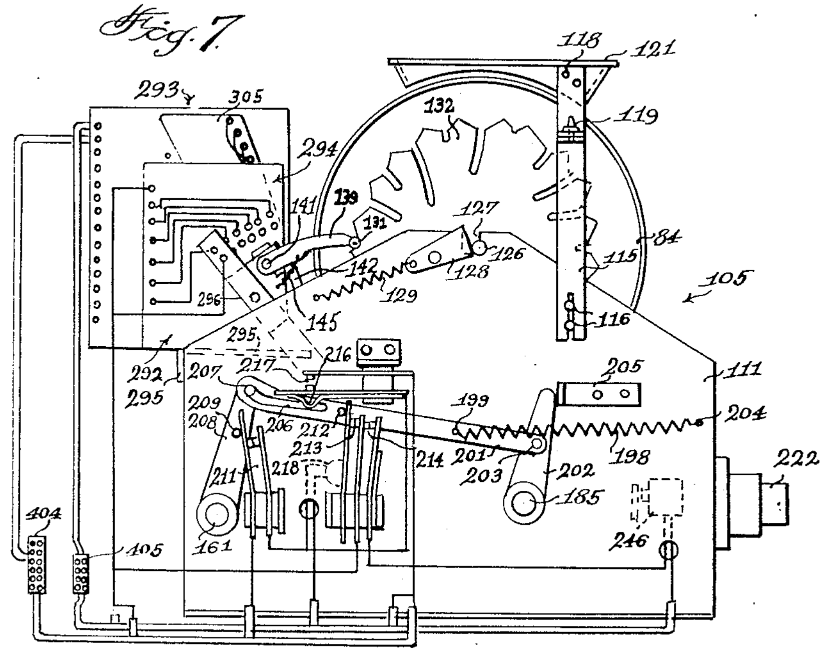
Figure 7 is a view in elevation of the reel mechanism as viewed along the line 7—7 of Figure 6.
Figure 6:
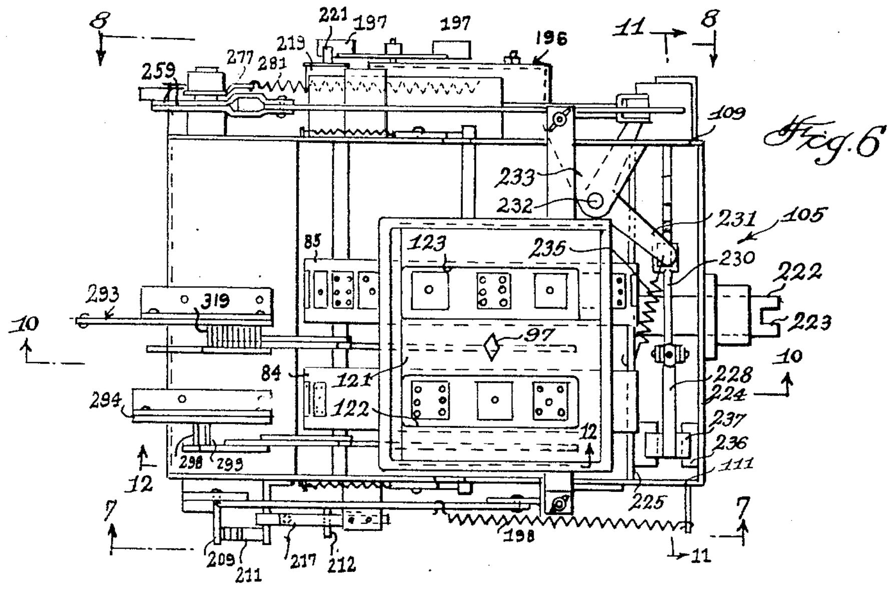
Figure 6 is a plan view of the reel mechanism as viewed along the line 6—6 of Figure 3.
Figure 8:
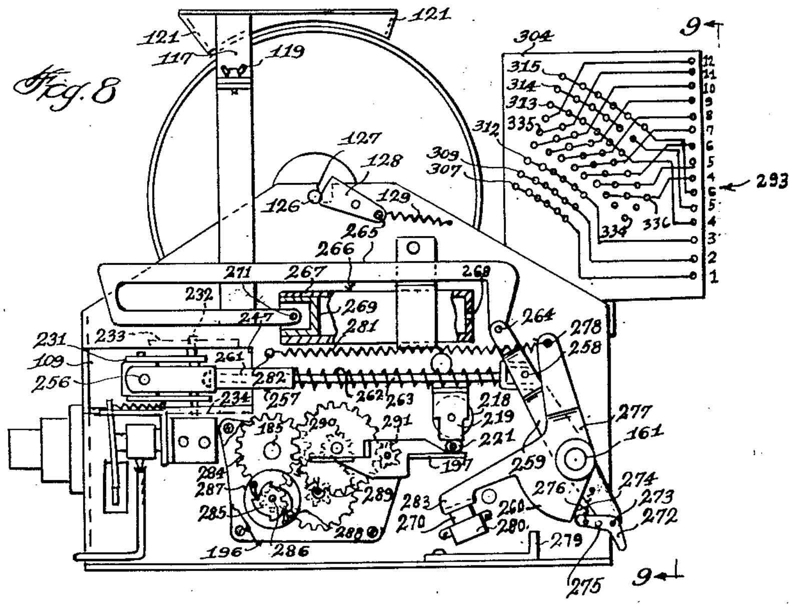
Figure 8 is a view in elevation of the reel mechanism as viewed along the line 8—8 of Figure 6.

The dice reels 84 and 85 are mounted for free rotation side-by-side on a shaft 126 which is suitably supported by frame members 109 and 111 in bayonet slots therefor as best seen in Figures 7 and 8 as at 127. The shaft 126 is removably retained within the bayonet slots by means of the pivoted pins 128 which are yieldably held in shaft retaining positions as by the springs 129.

As aforementioned, the dice reels 84 and 85 are mounted for free, independent rotation on shaft 126. Each of these reels, however, normally is retained in one of a plurality of rotational stop positions by means of a roller 131 which is constructed and arranged for movement into one of a plurality of slots formed in the disk member 132 which is secured to the reel for rotation therewith, the disks for the two reels being generally similar and there being a slot for each of the dice symbols appearing on the reels.

Roller 131 for stopping dice reel 85 is rotatively carried on an arm 133 which is pivotally secured as at 134 to a selector arm 135. Pivotal movement of arm 133 on selector arm 135 is limited by the stops 136 and 137 thereon, the arm normally being yieldably urged against the stop 136 by the spring 138.

Similarly, roller 131 for dice reel 84 is rotatively supported on an arm 139 which is pivotally secured to a selector arm 142 as at 141. Arm 139 also has limited pivotal movement on its selector arm 142 between stops 143 and 144 thereon, the arm 139 normally being yieldably urged against the stop 143 by the spring 145.

Both selector arms 135 and 142 are pivotally supported on a shaft 146 which is secured at the ends thereof to the frame members 109 and 111. The rollers 131 thus move along arcs as their respective selector arms move pivotally about the axis of shaft 146. The slots in the reel disks 132 for receiving the rollers 131 are formed along these arcs, the slot 147' is a shallow slot corresponding to the dice numeral 1 and is engaged by the roller 131 when the dice symbol 1 is disposed opposite the reference mark 97. The slot $147^6$ is the deepest slot in disk 132 and corresponds to the dice symbol 6, the roller 131 being bottomed in this slot when the dice symbol 6 is disposed opposite the reference mark 97. Similarly, slots $147^2$, $147^3$, $147^4$, and $147^5$, which have depths intermediate the shallow depth of slot 147' and the deep slot $147^6$, correspond respectively to the dice symbols 2, 3, 4, and 5. It will be understood that the slotted construction of the disks 132 for the dice reels 84 and 85 is similar except that the variation in the depth of successive slots around the peripheries of the disks need not necessarily be the same, and preferably are of the random pattern as indicated by the arrangement of the dice symbols in Figure 22.

It may be well to mention at this point that the provision for limited pivotal movement of the arms 139 and 133 on their respective selector arms permits a self seeking movement of the rollers 131 as they proceed along the depth of slots 147 and as they enter the slots whereby such entrance is cushioned against the impact of the roller with the disk and the possibility of hanging up of the roller on the outer periphery of the disk is minimized.

Each dice reel disk 132 also has a driving roller 148 which is similar to the stop roller 131 and is movable into the slots 147 of their common disk 132. Drive roller 148 for reel disk 85 is rotatively carried on a bell crank 149 which is mounted on shaft 146 for free pivotal movement thereon. Similarly, the drive roller 148 for reel disk 84 is rotatively carried on a similar bell crank 151 which also is pivotally mounted on shaft 146 for free pivotal movement thereon. It will be noted, that the drive rollers 148 move about in arcs of less radius than that of stop rollers 131 about the axis of shaft 146. By reason of this arrangement, when the bell cranks 149 and 151 rotate clockwise as observed in Figure 12, for example, to move the drive rollers 148 into the slots 147, the disks 132 and reels individual thereto necessarily are rotated counterclockwise to a certain extent. Thus, when the drive rollers are suddenly withdrawn from the slots 147 the disks and reels are suddenly thrown or driven clockwise whereupon free rotary motion is imparted thereto, the stop rollers 131 having been wihdrawn from the slots 147 in a manner presently to appear.

Each of bell cranks 149 and 151 carries a pin 152 arranged to slide along a slot 153 therefor, the slots 153 being formed in identical links 154 and 155 individual to bell cranks 149 and 151 respectively. Links 154 and 155 are pivotally connected respectively by pins 156 to crank arms 157 and 158 individual thereto. Pin 152 on bell crank 151 is yieldably urged in the direction of pin 156 on crank arm 158 and against the inner end of slot 153 in link 155 by a coil spring 159. A similar coil spring 159, in similar manner, interconnects the pins 152 and 156 operatively associated with bell crank 149, link 154, and crank arm 157.

Figure 12:
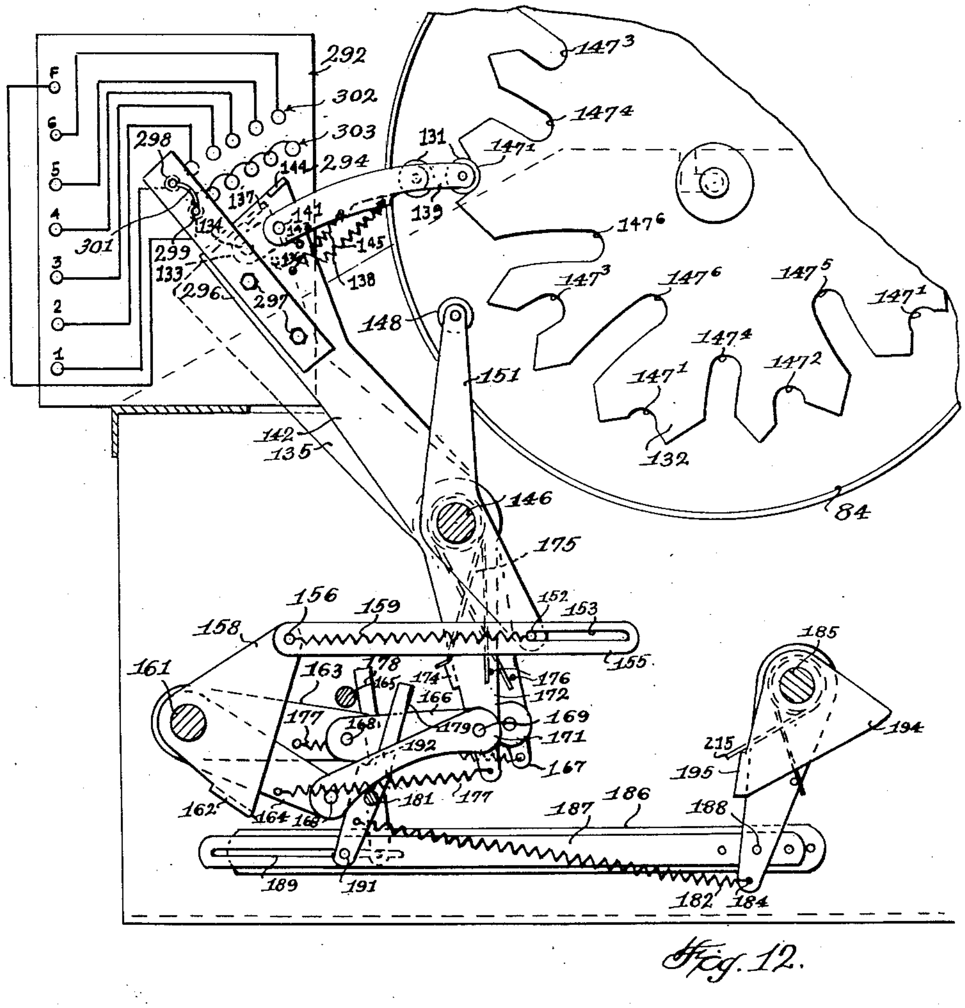
Figure 12 is a sectional view similar to Figure 10 and taken along the line 12—12 of Figure 6.

Crank arm 157 and 158 normally rest in the positions as seen, for example, in Figure 12, wherein only crank arm 158, link 155, and bell crank 151 are seen for the reason that a pair of identical means is employed to actuate the dice reels 84 and 85, bell crank 149, link 154, and crank arm 157 for reel 85 being thus disposed directly behind the corresponding parts for driving reel 84 and thereby hidden from view in Figure 12.

Both crank arms 157 and 158 are secured to a shaft 161 for rocking movement therewith, the end portions of this shaft being suitably journalled respectively in frame members 109 and 111. By reason of this arrangement, when shaft 161 is rocked counterclockwise, as viewed in Figure 12, links 154 and 155 are moved to the left and bell cranks 149 and 151 are rocked clockwise by reason of the pulling force exerted thereon by springs 159. In the event that the rollers 148 should become hung up on the disk 132 or the movement of the rollers within the slots 147 be obstructed, the tension in springs 159 merely is increased as the counterclockwise movement of shaft 161 is continued. As will subsequently appear more fully in detail, when shaft 161 has rocked counterclockwise to a certain extent, the manual driving force thereon is suddenly interrupted and the shaft is suddenly returned clockwise under force of energy released from a spring for driving the shaft clockwise.

Each of crank arms 157 and 158 has a right angularly bent portion or tab 162, tabs 162 for crank arms 157 and 158 being arranged to engage arms 163 and 164 individual thereto as the crank arms are moved counterclockwise as viewed in Figure 12 whereby the arms 163 and 164 are rocked counterclockwise into engagement with shaft 165 which is supported on the ends thereof in frame members 109 and 111. Arm 163 is connected to an arm 167 which is freely mounted pivotally on shaft 146 by means of a link 166 which is pivotally connected thereto as by the pins 168 and 169 respectively. Similarly, arm 164 is connected to a similar arm 172 by means of a link 171 having pivotal connections 168 and 169 therewith. Selector arms 135 and 142 have lower extremities which terminate in right angularly bent portions or tabs 174 which respectively engage arms 167 and 172. By reason of this arrangement when the arms 163 and 164 are moved counterclockwise, arms 167 and 172 individual thereto are also rocked counterclockwise, and these latter arms, each by reason of its spring 175 connection with the selector arms 135 and 142 individual thereto, cause the selector arms also to be driven yieldably counterclockwise whereby the rollers 131 are moved outwardly of the slots 147 in the disks 132 individual thereto. Wire springs 175 are wound one or more turns about shaft 146 and the ends thereof are yieldably urged respectively against pins 176 which are carried by arms 167 and 172, the other ends of springs 175 being yieldably urged respectively against the angular portions or tabs 174 of selector arms 135 and 142. By reason of the yiedlable connection provided by springs 175, arms 167 and 172 can continue counterclockwise movements should the rollers 131 for any reason be caused to jam in the movement thereof outwardly of the slots 147.

Arms 163 and 167 are interconnected by a spring 177, and a similar spring interconnects arms 164 and 172, these springs extending above the pivot pins 168 individual to the cooperating arms thereof whereby the arms 163 and 164 and their connecting links 166 and 171 tend to jackknife or buckle as indicated by arm 164 and link 171 in Figure 12. Arms 163 and 164, however, when moved counterclockwise against shaft 165 are retained thereagainst for different limited predetermined intervals by identical trigger fingers 178 and 179 which are supported for free pivotal movement about a shaft 181, this shaft being secured at the ends thereof to frame members 109 and 111. In the cocked position of arms 163 and 164 against shaft 165, the upper extremities of trigger fingers 178 and 179 bear against shaft 165, being urged thereagainst yieldably each by a coil spring 182 connected to the lower extremity thereof. The other end of coil spring 182 connected to trigger finger 178 is connected to an arm 183 and, similarly, the other end of the spring 182 connected to trigger finger 179 is connected to an arm 184. Arms 183 and 184 are mounted for free pivotal movement on a shaft 185 which, in turn, is journalled at the end portions thereof in frame members 109 and 111. Arms 183 and 184 are connected respectively to trigger fingers 178 and 179 by a pair of links 186 and 187, these links being pivotally connected with arms 183 and 184 as by the pins 188. The other end of each link is provided with a slot 189 within which is carried a pin 191 for sliding movement therein, the pin for link 186 being carried at the lower extremity of trigger finger 178 and also serving to connect the coil spring 182 thereto if desired. Similarly, the pin 191 which cooperates with link 187 is carried at the lower extremity of trigger finger 179 and the tensioning spring 182 therefor many be connected to this pin if desired.

The trigger fingers 178 and 179 each has a latch surface 192 which slides under and engages the under edge surface of arm 163 or 164 adjacent thereto whereby these arms are retained against the shaft 165, the trigger fingers being urged into this latching position by the coil springs 182 which become further tensioned as their respective arms 183 and 184 are rocked counterclockwise in a manner presently to be described.

Arms 183 and 184 have driving members 193 and 194 therefor respectively, these members being secured to shaft 185 for rocking movement therewith and each having an angularly bent portion or tab 195 for engaging its coacting arm. Shaft 185 has an end portion which extends beyond frame member 109 and is connected to the low speed end of a gear reduction generally designated 196. The high speed end of gear reduction 196 drives an air impeller blade 197 whereby the gear reduction and impeller blade constitute a governor or timer for measuring intervals of time as shaft 185 is driven clockwise, as viewed in Figure 7, under power of a spring 198 which is connected as at 199 to a link 201 which is pivotally connected to an arm 202 as at 203, the arm 202 being secured to the extended portion of shaft 185 disposed outwardly of frame member 111 whereby arm 202 is adapted for rocking movement with shaft 185. The other end of spring 198 is connected to a pin 204 which, in turn, is secured to frame member 111 whereby arm 202 normally is urged by the tension in the spring against a stop 205 which is also secured to frame member 111.

The other end of link 201 has a slot 206 which extends upwardly at an angle adjacent the end extremity thereof for a purpose presently to appear. This angular portion of slot 206 normally has a pin 207 therein which is adapted to move freely along the length of the slot. Pin 207 is carried by an arm 208 which is secured to shaft 161 at the end portion thereof extending outwardly of frame member 111 whereby arm 208 is adapted for rocking movement with shaft 161 which, it will be recalled, is manually driven counterclockwise and then is released suddenly for rapid movement clockwise, as viewed in Figure 7. In the position of rest of arm 208 as viewed in Figure 7, a pin 209 carried thereby causes a pair of contacts 211 to be closed, and a pin 212 carried by link 201 causes two pairs of contacts 213 and 214 to be closed by bearing thereagainst. As arm 208 is moved counterclockwise by shaft 161 and link 201 is moved to the left, as viewed in Figure 7, by pin 207 the pairs of contacts for switches 211, 213 and 214 are opened as their respective actuating pins 209 and 212 move away therefrom, and concurrently with this operation, arm 202 is also moved counterclockwise by reason of its pivotal connection with link 201 and the tension in coil spring 198 is increased. As arm 202 moves counterclockwise it rocks shaft 185 therewith whereby driving members 193 and 194 by reason of their driving connection 195 with arms 183 and 184 cause these arms, as viewed in Figure 12, to be driven counterclockwise, thereby to move the trigger fingers 178 and 179 into latching engagement with arms 163 and 164 which, it will be recalled, are moved into engagement with shaft 165 as shaft 161 is moved counterclockwise manually.

When shaft 161 is released suddenly, the inner ends of slots 153 in links 154 and 155 forcibly engage pins 152 carried by bell cranks 149 and 151 with the result that rollers 148 carried by the bell cranks are rapidly driven outwardly of slots 147 in the drive disks 132 for dice reels 84 and 85 whereby free rotary motion is thus imparted thereto.

Although crank arms 157 and 158 have now returned to their normal positions as indicated in Figure 12, for example, arms 163 and 164 do not at this time move clockwise to their normal positions for the reason that they are retained in engagement with shaft 165 by trigger fingers 178 and 179. Shaft 185, however, is now being driven clockwise by coil spring 198, these motions being as viewed in Figures 7 and 12, and driving members 193 and 194, each by reason of its spring connection 215 which is similar to the spring connections 175 for selector arms 135 and 142, cause their coacting arms 183 and 184 to be driven clockwise as viewed in Figure 12 which, in turn, cause links 186 and 187 to be moved to the left as viewed in this figure. These links, however, move in this direction at a rate controlled by the aforedescribed governor action on shaft 185 whereby predetermined intervals of time are caused to elapse before the inner ends of slots 189 in links 186 and 187 engage the pins individual thereto and carried respectively by the trigger fingers 178 and 179 respectively.

Links 186 and 187 are identical. With respect to their trigger releasing function, however, these links differ in that their effective length between their slots 189 and their pivot pins 188 are different with the result that one of the trigger fingers is released first from latching engagement with arms 163 or 164, as the case may be. In the arrangement disclosed, link 187 has the longer effective length whereby it engages trigger finger 179 to engage the same before link 186 engages trigger finger 178 to release arm 163, this sequence being disclosed in Figure 12 where, it will be observed, that arm 163 is still retained in latched position whereas arm 164 has been released. This has the result of causing dice reel 84 to be stopped first although, it will be understood, that when it is desired, dice reel 85 may be caused to stop first.

The desired stopping sequence of dice reels 84 and 85 is accomplished by the particular connection of arms 183 and 184 to their respective links 186 and 187. It will be noted that each of these links has three openings adjacent the arms connected thereto. Thus, as in the arrangement disclosed, pin 188 on arm 184 makes pivotal connection with link 187 at the central opening therein whereby the effective length of this link is longer than that of link 186 whose pivotal connection with arm 183 is made at the innermost opening in link 186.

Referring again to Figure 7 and assuming again that shaft 161 and arm 208 have just been released for rapid movement clockwise to the normal position thereof as shown in this figure, the pin 207 will now be in the longitudinal portion of slot 206 of link 201, it being recalled that at this time link 201 is in the moved position to the left and is just beginning its movement to the right toward its normal position under power of spring 198. When pin 207 is in the longitudinal portion of slot 206, pin 212 on link 201 is in a more elevated position than when the pin is in the angular portion of slot 206. Consequently, when pin 212 moves to the right on the return stroke of link 201, pin 212 engages the actuating nub 216 for the normally open pair of contacts 217 and momentarily closes the same whereas during the movement of link 201 to the left, pin 212 being in a less elevated position, it misses or clears the actuating nub 216 and consequently does not close switch 217.

An electromagnet 218 is secured to frame member 109 and has a movable armature 219. A suitable stop member 221 is carried by the armature 219 and is so arranged with respect to the air impeller blade 197 as to stop rotation thereof when the electromagnet 218 is deenergized, stop member 221 being withdrawn from the path of rotation of the air impeller blade as armature 219 moves toward frame member 109 upon energization of the electromagnet 218, as may best be understood from the disclosure of Figure 8. Energization of electromagnet 218 is controlled by the aforementioned switch 211 which, it will be recalled, is closed when the handle driven arm 208 is in the normal position of rest thereof, as may best be seen in Figure 7. Consequently, the aforedescribed gear reduction governor including impeller blade 197 is released for operation when arm 202 begins its return movement clockwise under power of spring 198, as aforedescribed.

The manner in which shaft 161 is driven by the manually operable handle 52 and the manner in which the handle is released for this purpose will now be described. Handle 52 is supported on a shaft 222 to which it is locked for rotary movement by a portion thereof, not shown, which is interfittingly received within the diametrical slot 223 formed in the end of the shaft. Shaft 222 is journalled in a pair of spaced plates 224 and 225 which are secured to frame members 109 and 111 and extend therebetween. Shaft 222 has a central bore for receiving a long bolt 226 which is inserted into the shaft at the end thereof adjacent supporting plate 225. Bolt 226 serves to secure handle 52 in locked position on shaft 222, and by this arrangement, prevents removal of the handle except by access to the bolt 226 from within the cabinet 51.

Shaft 222 has secured thereto a gear segment 227 which has integrally formed therewith an elongated arm 228 and a short arm 229. Short arm 229 is connected by the universal linkage 230 to one end of a bell crank 231 which is pivotally supported as by the pin 232 in a pair of brackets 233 and 234 which are suitably secured to frame member 109. A coil spring 235 which is secured at one end to the bell crank 231 and at the other end to plate 225 yieldably urges the long arm 228 against a pair of stop members 236 secured respectively to plates 224 and 225, the elongated arm 228 having a member 237 which bridges the stop members 236 upon making engagement therewith. Spring 235 also serves to return handle 52 to its normal position after the handle has been operated to impart rotary movement to the dice reels.

Figures 9, 11:
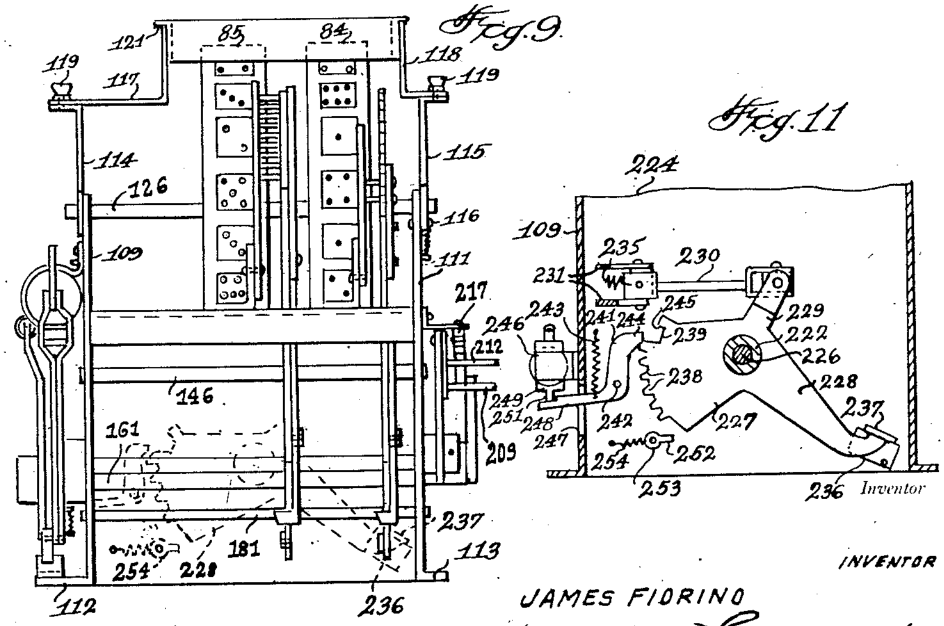
Figure 9 is a view in elevation of the reel mechanism as viewed along the line 9—9 of Figure 8.
Figure 11 is a fragmentary sectional view of the reel mechanism taken along the line 11—11 of Figure 6 and illustrating the mechanism for releasing the operating handle of the device.

Gear segment 227 has the usual gear teeth 238 and enlarged and deepended peripheral notch 239 which is constructed and arranged to coact with a pawl 241 to prevent counterclockwise movement of gear segment 227, as viewed in Figure 11. Pawl 241 is pivotally supported on plate 224 as at 242 and is yieldably urged by a spring 243 so as to move the pawl into the notch 239 to bring the edge surface 244 of the pawl into locking engagement with the edge surface 245 of the gear segment when handle 52 is rocked a small amount in an attempt to operate the amusement device without depositing a playing piece therein to unlock the device for operation.

As will appear in greater detail as the description proceeds, when a playing piece is deposited into the device, circuits including the aforementioned coin control switch 68 become effective to operate the electromagnet 246 which is supported on frame member 109 adjacent an opening 247 therein through which extends an arm 248 of pawl 241. Electromagnet 246 has an armature 249 which carries a latch member 251 arranged to engage the extended arm 248 of pawl 241 in overlying engagement therewith whereby clockwise movement of the pawl about pivot 242 as viewed in Figure 11 is prevented and counterclockwise movement of the gear segment 227 is permitted as the locking edge portion 245 of the segment moves past the otherwise locking edge portion 244 of pawl 241. During this counterclockwise movement of gear segment 227, teeth 238 thereof brush past a detent 252 which is pivotally supported as at 253 on the plate 224, the detent normally being urged as by the spring 254 so as to maintain a substantially horizontal position as disclosed in Figure 11. By reason of this arrangement, detent 252 serves as a self ratcheting arrangement to prevent reversal of movement of gear segment 227 as the detent engages successive teeth 238 upon continued counterclockwise movement of the gear segment. When detent 252 moves into the deep slot 239, however, there is sufficient clearance for the detent to rotate counterclockwise so that the teeth 238 can now brush past the detent as the gear segment 227 moves clockwise until the lowermost tooth 238 has brushed past the detent whereupon the detent can also rotate clockwise to its normal position to which it is urged by the tension in spring 254.

Energization of electromagnet 246 is controlled by the aforementioned switch 214 which opens during the initial movement of handle 52 and does not close until the governor controlled arm 202 moves into engagement with the stop 205. Consequently, handle 52 cannot be operated more than once during any one cycle of operations of the amusement device, which cycle of operations corresponds to a roll of the dice reels 84 and 85 and terminates as the arm 202 engages the stop 205.

The other end of bell crank 231 extends through an opening 247 in frame member 109 where it is universally connected pivotally as at 256 to a link generally designated 257 and similarly pivotally connected as at 258 to an arm 259 which is journalled for free rotary movement on shaft 161. Link 257 includes two parts 261 and 263 having a coil spring 262 interposed therebetween and sleeved about the rod portion of part 263, which rod portion is received slidably within a bore formed therefor within part 261 whereby link 257 is adapted to yield sufficiently to prevent damage to the handle drive mechanism should the mechanism jam sufficiently for any reason to produce an opposing force which exceeds the force of spring 262 between link parts 261 and 263. Arm 259 is pivotally connected as at 264 to the arm of a dash pot generally designated 266. The dash pot comprises a cylinder 267 having a restricted orifice 268 for the escape of air therefrom as the piston 269 is moved in the cylinder toward the orifice, piston 269 being connected as at 271 to the dash pot actuating arm 265. Dash pot 266 serves, in a well known manner, to prevent sudden movement of handle 52 in either direction of rotation.

Arm 259 at the lower extremity thereof carries a bell-shaped trigger member 272 which is pivotally secured thereto as at 273 and urged clockwise thereabout, as viewed in Figure 8, by the spring 274, this movement of the trigger member 272 being limited as by the pin 275, or the like, which engages the arm 259.

In this limited position of the trigger member 272, it engages the edge surface 276 of a bell crank 277 which is secured to the portion of shaft 161 which extends outwardly of frame member 109 for rocking movement with the shaft. By reason of this arrangement, bell crank 277 is constrained to follow the rocking movement of arm 259 clockwise, as viewed in Figure 8, in response to actuation of the handle 52 which operates through the gear segment arm 229, link 230, bell crank 231, and yieldable link 257, as aforedescribed, to impart this rocking movement to arm 259. Bell crank 277 is connected as at 278 to a coil spring 281 which is connected at the other end thereof to the frame member 109 as at 282 whereby as the bell crank moves clockwise with arm 259 the tension in spring 281 is increased with the result that the other end 283 of the bell crank is moved suddenly counterclockwise and forcibly into engagement with the resilient stop member 270 when the bell crank is released from the arm 259. Stop member 270, which may be of any suitable material such, for example, as hard rubber, is secured in position on frame member 109 as by the clamp device 280. Release of bell crank 277 from arm 259 occurs as the lower end of trigger member 272 moves into engagement with a stop member 279 secured to frame member 109. As this end of the trigger member engages stop 279, further clockwise movement of arm 259 on shaft 161 causes the trigger member to rock counterclockwise about its pivot 273 on arm 259 whereupon the arcuate surface 260 of the bell crank clears the trigger member and thus permits the bell crank to move suddenly counterclockwise to its initial position as shown in Figure 8 under power of spring 281. This, of course, provides the sudden return movement of shaft 161 and arm 158 and arm 208, as aforedescribed.

As may best be seen in Figure 8, gear reduction 196 comprises a gear 284 which is secured to shaft 185 for rotation therewith, and this gear drives a pinion 285 which is mounted for rotation about a shaft 286. Also, mounted for free rotation on shaft 286 is a gear 287 which carries a pair of pawls 288. These pawls are so pivotally mounted on gear 287 as to engage the teeth of pinion 285 in a manner to permit clockwise rocking movement of shaft 185 and ratcheting movement of the pinion 285 counterclockwise at the pawls. When shaft 185, however, is driven counterclockwise, as viewed in Figure 8, under power of coil spring 198, the pawls 288 are effective to engage pinion 285 and lock gear 287 thereto for rotation therewith whereby rotary motion is transmitted through the pinion and gear combination 289 and 290 to the pinion 291 secured to the impeller blade 197 whereby counterclockwise rotation of the impeller blade occurs when the magnet stop member 221 is withdrawn out of the path of rotation thereof, as aforedescribed. By reason of this one way drive for the impeller blade 197, although, as will appear more fully hereinafter, the governor control magnet 218 is de-energized during the effective or forward movement of the operating handle 52, and rotation of the impeller blade 197 is thereby blocked, initial rocking movement of shaft 185 is permitted for the purpose of loading the power supplying return spring 198 therefor and to permit movement of the trigger fingers 178 and 179 into latching engagement with respect to the arms 163 and 164 individual thereto.

In addition to the aforedescribed functions of rolling the dice reels 84 and 85, locking and releasing the operating handle 52, and actuating certain switches during the cycle of operations thereof, the reel mechanism also has the function of electrically adding the dice symbols or numbers corresponding to the various rotational stop positions of the dice reels to provide various circuit functions having numbers corresponding to the crap and point combinations four to eleven inclusive. This electrical addition is accomplished as herein disclosed by the provision of a pair of selector switches generally designated 292 and 293.

Selector switch 292 is a single pole, six position switch which comprises a terminal board or plate 294 which is secured in a generally upright manner as illustrated on the angle member 295 which interconnects frame members 109 and 111. Switch 292 also comprises a movable plate or member 296 which is secured as at 297 to selector arm 142. Plate 296 carries a pair of brushes 298 and 299 which are interconnected electrically as by the conductor 301. These brushes sweep over rows of contacts 302 and 303 individual thereto, the contacts of row 303 being interconnected electrically and serve to supply current to the movable brush 299 without the need for a flexible lead or the like. Contacts 302 and 303, of course, are carried by the terminal board 294 which also carries a plurality of terminals which are individually connected in successive order to the contacts of row 302 and designated by the numerals 1 to 6 and an additional terminal designated F which is connected to the contacts of row 303. By reason of this arrangement, when selector arm 142 is positioned as illustrated in Figure 12, in which roller 131 is resting in slot 147′ of the slotted disk 132 for dice reel 84, brush 298 is in engagement with contact one of selector switch 292. Similarly, when roller 131 is disposed in slot $147^6$, brush 298 is in engagement with contact six of the switch, and in like manner, brush 298 engages the intermediate contacts 2, 3, 4, and 5 when roller 131 is at rest in the bottom of slot $147^2$, $147^3$, $147^4$, and $147^5$.

Selector switch 293 is a six pole, six position switch which comprises a terminal board or plate 304 which is secured in an upright position to angle member 295 generally in parallel spaced relation with respect to terminal board 294 of selector switch 292. Selector switch 293 also comprises a movable plate or member 305 which is secured as at 306 to selector arm 135. Movable plate 305 carries twelve brushes which selectively engage predetermined contacts carried by the terminal board 304 as the movable plate 305 is moved successively into the six positions of the selector switch. Terminal board 304 also carries a plurality of terminals of which the lowermost terminal designated 1 is electrically connected to the correspondingly numbered terminal on terminal board 294 of selector switch 292. This terminal is also connected to a row of interconnected contacts designated 307 and over which sweeps a brush 308. Similarly, a terminal 2 which is connected electrically to the corresponding terminal of selector switch 293 is electrically connected to an interconnected row of contacts 309 which are successively engaged by a brush 311 as the selector switch is moved to the different positions thereof. In like manner, the next adjacent terminals 3, 4, 5, and 6 are connected to interconnected contact rows 312 to 315 respectively, and these contact rows, in turn, are cooperatively engaged by brushes 316 to 319 respectively. The terminals, contacts, and brushes thus far described of selector switch 293 are those employed to conduct current from terminals 1 to 6 of selector switch 292 to the movable plate 305 of selector switch 293, this being for the purpose of avoiding the use of flexible leads for this purpose. Brushes 308, 311, and 316 to 319 are electrically connected as by conductors 322 to 327 to brushes 328 to 333 respectively.

Brushes 328 and 331 sweep across a row of nine contacts designated 334. These brushes are spaced from each other along this row by having two contacts interposed therebetween whereby brush 328 sweeps across the first six contacts in the row and brush 331 sweeps across the last six contacts in the row as the selector switch moves from position 1 to position 6 thereof. In like manner, brush combinations 329 and 332, and 330 and 333 sweep across contact rows designated 335 and 336 respectively. By reason of this arrangement, when brushes 328 to 330 are in the fourth position of the switch, these brushes engage contacts which are engaged by brushes 331 to 333 when switch 293 is in the first position thereof. This arrangement provides an overlapping of contact functions resulting in the elimination of nine contacts which otherwise would have been required if six rows of six contacts each were employed side by side in lieu of the three rows of nine contacts each as disclosed. The disclosed arrangement of staggering the brushes also has the advantage of minimizing the space required for selector switch 293, it being apparent from an inspection of the disclosure as seen in Figure 8, that additional rows of contacts on terminal board 304, without excessive crowding of the contacts, would require that the limit of the terminal board 304 be extended beyond the limit of the frame member 121 which, as aforedescribed, is arranged just subjacently of the inside surface of cover 76.

As may best be seen in Figure 8, the first contact of row 336 is connected to the second contact of row 335 and the third contact of row 334 and these interconnected contacts are connected to the point terminal number 4 on the terminal board 304 of selector switch 293. Similarly, the second contact of row 336 is connected to the third contact of row 335 and to the fourth contact of row 334 and these interconnected contacts are connected to point terminal number 5. In like manner, this manner of contact interconnections is carried forward for the remaining contacts of these rows whereby the point terminals 6 to 11 are connected thereto as indicated, the ninth terminal of row 336 which would correspond to point 12, the first contact of row 335 and the second terminal of row 334 which would be interconnected and which would correspond to point three, and the first terminal of row 334 which would correspond to point two, being left blank or unconnected for the reason that no external circuit connections with terminals 2, 3 and 12, as best seen in Figure 20, are required for correct operation of the amusement device of the present invention for simulation of plays involving the combinations 2, 3 and 12.

Figure 20:
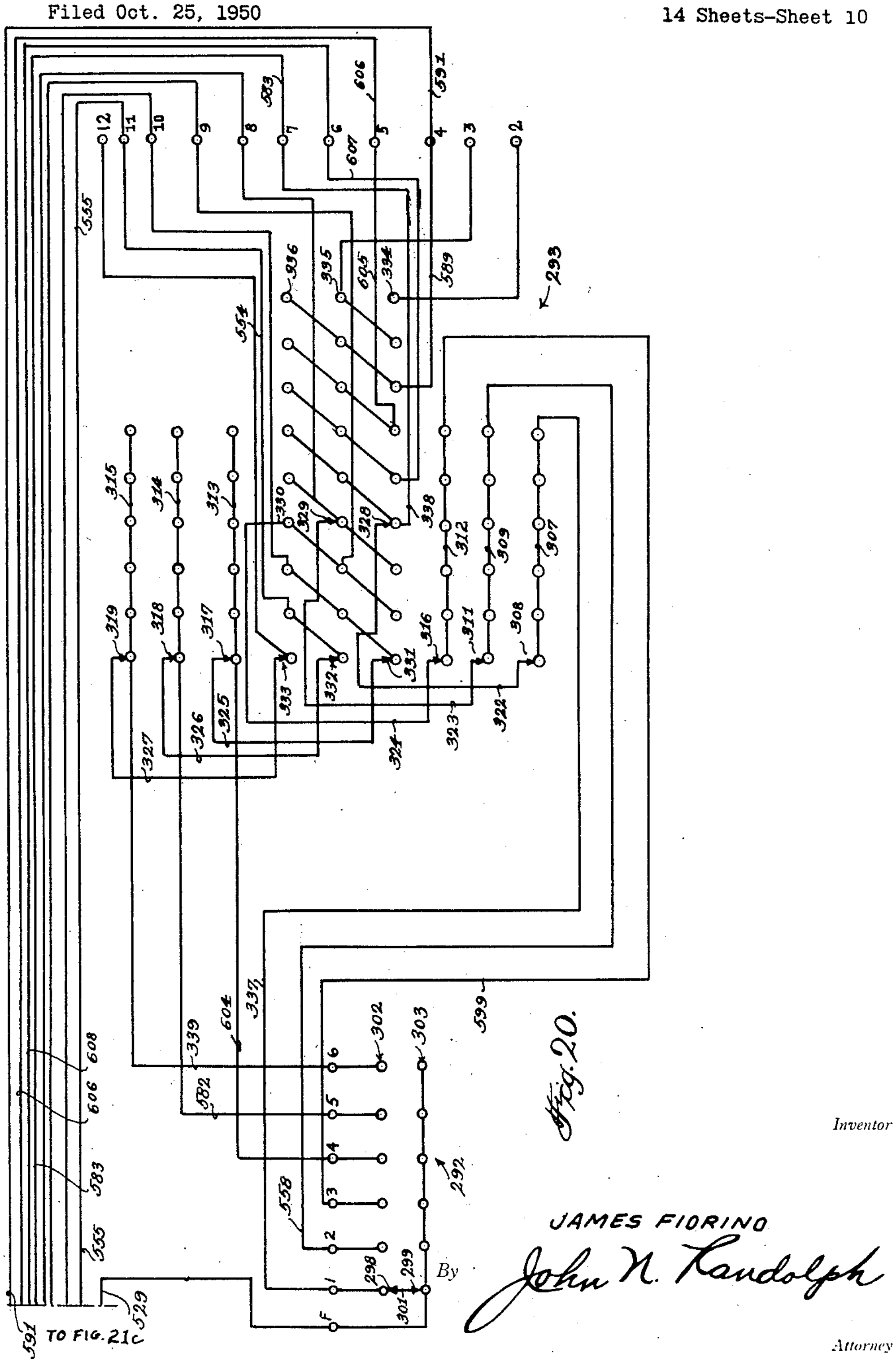
Figure 20 is a diagrammatic view of the electrical arrangement of the wipers and contact bank connections for the reel selector switches.

The manner in which selector switches 292 and 293 electrically add the dice numbers or symbols corresponding to the various rotational stop positions of the dice reels 84 and 85 will best be understood by reference to Figure 20. Assume that dice reel 84 has stopped with the dice symbol 1 disposed opposite the reference mark 97 and the dice cylinder 85 is stopped with the dice symbol 6 disposed opposite this reference mark whereby the brushes 298 and 299 of selector switch 292 are in the first position of the switch and the brushes of selector switch 293 are in the sixth position of the switch, as indicated in Figure 20. In this case, the dice reels 84 and 85 individually display the dice symbols 1 and 6 and collectively display the point or crap combination 7, as the case may be. Accordingly, the function of selector switches 292 and 293 is to electrically add the numbers 1 and 6 and produce a circuit function having a number which is the sum of numbers 1 and 6, namely, 7. The circuit function herein desired is that circuit be completed between the terminal F on selector switch 292 and terminal 7 on selector switch 293, this circuit being traced as follows: From terminal F to contact row 303, brush 299, conductor 301, brush 298, contact one of row 302, terminal one, conductor 337, contact row 307 of switch 293, brush 308, conductor 322, brush 328 in contact with the sixth contact from the right of row 334 and thence by way of conductor 338 to terminal seven on selector switch 293. Assume as another example that dice reel 84 has turned up dice symbol 6 and dice reel 85 has turned up dice symbol 1 whereby selector switch 292 is in position 6 thereof and selector switch 293 is in position 1 thereof in which case the dice reels collectively display the point or crap combination 7, whichever the case may be, and the function again of selector switches 292 and 293 is to complete the circuit between terminal F on selector switch 292 and terminal 7 on selector switch 293. In this case, the circuit between these terminals is traced as follows: From terminal F to contact row 303, brush 299, conductor 301, brush 298 in contact with the sixth contact of row 302, then outwardly of switch 292 by way of terminal six thereof to conductor 339, contact row 315 of switch 293, brush 319, conductor 327, brush 333 in contact with the fourth contact from the right of row 336, thence by way of the fifth contact from the left of row 335 and the sixth contact from the right of row 334 to conductor 338 which, as aforetraced, is connected to terminal 7 of selector switch 293.

From the foregoing it should now be apparent that a useful sub-combination of parts of the amusement device of the present invention has been provided wherein a pair of selector switches each having six positions may be caused individually to assume different ones of these positions simultaneously and, when desired, fortuitously, and wherein these switches are so wired together as to selectively complete a plurality of circuits therethrough, each of which circuits may be numbered or otherwise identified with a number corresponding to the sum of the selector switch positions for each of the various position combinations of the switches. Thus, an arrangement is provided in which any one of a plurality of circuit functions is established in accordance with the sum of a pair of numbers corresponding to any one of a plurality of pairs to functions such, for example, as in the instant case, the various rotational stop positions of the dice reels 84 and 85.

In the diagrammatic arrangement of selector switches 292 and 293 as illustrated in Figure 20, additional terminals two, three and twelve have been indicated for selector switch 293 for the reason that this figure illustrates the utility of the selector switches per se as an electrically adding device independently of the over-all purpose and function of the amusement device 50. As disclosed in Figure 20, a circuit is completed to terminal two of switch 293 when both switches 292 and 293 are in position one thereof, and a circuit is completed to terminal twelve of switch 293 when both switches 292 and 293 are in position six thereof. In like manner, a circuit is completed to terminal three of switch 293 when switch 292 is in position one thereof and switch 293 is in position two thereof or when switch 292 is in position two thereof and switch 293 is in position one thereof. It will be understood, moreover, that the concept of the present invention residing in the additive arrangement of the selector switches need not be limited to the specific six position combinations disclosed for the reason that the same additive principle applies when switches having a greater or lesser number of positions are employed. In any case, there will be as many poles on switch 293 as there are positions on switch 292. However, switch 293 may have more or less positions than switch 292.

From the foregoing, the manner of operation of the reel mechanism should now be apparent. However, a cycle of operations of the reel mechanism will now be summarized briefly by reference to Figure 24.

In the chart of Figure 24, the inclined line 339 indicates the forward movement of handle 52, the vertical line 342 indicates the reversal of movement of the handle, and the inclined line 341 indicates the return movement of the handle. It will be understood that the time required for the forward and return movements of the handle during the time of one complete cycle of operations of the reel mechanism will vary with the vigorousness of manipulation of the handle by different players of the amusement device. In any event, there will be limits on the time of operation of handle 52 imposed by the action of dash pot 266. Of course, in order for complete operation of the handle, the handle control magnet 246 must be energized for an interval sufficient to permit the edge 245 of gear segment 227 to safely clear the locking edge 244 of pawl 241. For this purpose, the handle control magnet 246 is energized for an interval indicated by the horizontal line 343.

When a playing piece has not been deposited in the amusement device 50, and consequently, the electromagnet 246 is not energized, handle 52 is free to move a limited distance before the handle locking surfaces 244 and 245 on pawl 241 in gear segment 227 respectively move into locking engagement. This free movement is indicated by the horizontal line portion 344 which, it will be noted has a shorter length than horizontal line 343 which indicates the duration of energization of the handle control magnet 246 during the initial forward movement of handle 52. This free initial movement of handle 52 may be regarded as backlash in the linkage or driving connections between the handle and arm 259 whereby movement of the arm begins at the termination of the free movement 344 and is designated by the inclined line 345. After taking up the backlash indicated at 346, arm 259 reverses as at 347, and then follows the handle movement by returning as indicated by the inclined line 348.

Trigger member 272 is carried by arm 259 as indicated by the inclined line portion 349. When the trigger finger 272 strikes the stop 279, it releases the bell crank 277, and this release movement is indicated by the further inclined line portion 351. Trigger member 272 then reverses with arm 259 as indicated at 352 and follows the return movement thereof as indicated by the inclined line portion 353, the trigger member just prior to the return of the arm 259 snapping back into its initial position in locking engagement with surface 276 of bell crank 277, this snapping action of the trigger member being indicated by the further inclined line portion 354.

Bell crank 277 and arm 208 are secured to shaft 161 and, accordingly, these parts all follow the movement of the bell crank 277, the forward movement of which is indicated by the inclined line portion 355, reverse movement as indicated at 356, and the sudden return movement indicated by the short inclined line portion 357, the return movement being caused by the release of tension in coil spring 281.

Pin 209 is carried by arm 208 and, accordingly, follows the movement thereof whereby switch 211 is opened a short interval after the start of movement of arm 208, the interval prior to opening of switch 211 being indicated by the short horizontal line 358. Switch 211 is closed again as indicated by the elongated horizontal line portion 359 upon the sudden return movement of arm 208 and pin 209 as indicated at 357. As will appear more fully hereinafter, switch 211 controls energization of the handle control magnet 246 and consequently the energization interval 343 thereof terminates as switch 211 opens, or stated in other words, the intervals 343 and 358 are of approximately equal duration.

The reel driving bell cranks 149 and 151 are connected to links 154 and 155 and crank arms 157 and 158 to shaft 161 whereby the movement of these parts follow the movements of shaft 161 as indicated at 355, 356, and 357. The dice reels 84 and 85 are first rotated relatively slowly by the bell cranks 151 and 149 individual thereto respectively as indicated by the inclined line portions 361 and 362. The reversal of rotative movement of the dice reels 84 and 85 as the bell cranks 151 and 149 reverse their directions of pivotal movement is indicated at 363 and 364 and the sudden second application of force to the dice reels by the bell cranks upon sudden return movement thereof is indicated by the short inclined line portions 365 and 366. Free spinning rotary motion of the dice reels then occurs as indicated by the elongated horizontal line portions 367 and 368. The manner in which this free rotary motion of the reels is terminated will now be considered.

Arm 208 drives arm 202 through link 201 and consequently, this arm and link and shaft 185 which is secured to arm 202 each has an initial movement indicated by the inclined line portion 367 which is similar to the movement of arm 208 as indicated at 355. These parts, however, do not begin immediate return movement under power of spring 198 for the reason that shaft 185 is locked against return movement by impeller blade 197 whose rotary movement, in turn, is blocked by the governor magnet 218. Energization of this magnet is controlled by switch 211 and consequently the initial energization thereof indicated by the short horizontal line 368 is equal approximately to the initially closed period of switch 211 as indicated at 358. The governor magnet, however, again becomes energized as indicated at 369 when switch 211 again closes. Until this occurs, there is a stalled interval of shaft 185 which is indicated by the short horizontal line portion 371.

When impeller blade 197 is released as indicated by the elongated line 372, shaft 185 is free to reverse its motion as indicated at 373 and the delayed return motion of the shaft under control of the gear reduction governor 196 continues as indicated by the elongated inclined line portion 374 until arm 202 strikes stop 205 to complete the cycle of operation of the reel mechanism.

Selector arm 135 and arm 163 are driven by shaft 161 and crank arm 157 during the forward movement thereof indicated at 355 and, consequently, these parts have a similar forward movement as indicated by the inclined line portion 375. Similarly, arm 164 and selector arm 142 which are driven by shaft 161 and crank arm 158 have a similar forward movement indicated by the inclined line portion 376. Trigger finger 178 which is driven by link 186, arm 183, driving member 193, and shaft 185, has an initial forward movement indicated by the inclined line portion 377 which is similar to the movement of these parts as indicated at 367. Similarly, trigger finger 179 which is driven by link 187, arm 184, driving member 194, and shaft 185 has a similar initial forward movement as indicated by the inclined line portion 378. In their forward positions, trigger fingers 178 and 179 latch arms 163 and 164 against the rod 165 in which position these arms and the selector arms 135 and 142 connected thereto are retained against return movement as indicated by the elongated horizontal lines 379 and 380 until released by the trigger fingers upon retraction thereof.

Trigger fingers 178 and 179, of course, are also retained in position against shaft 165, as indicated by the elongated horizontal line portions 381 and 382 respectively, until pins 191 carried thereby are engaged by the inner end of slots 189 of links 186 and 187 respectively, individual thereto. In the arrangement disclosed in Figure 12, link 187 is the first to release its trigger finger 179 as indicated at 383 after which trigger finger 179 is gradually returned as indicated by the inclined line portion 384 to its initial position of rest. Similarly, trigger finger 178 is subsequently released by link 186 as the inner end of the slot 189 thereof engages pin 191 carried by trigger finger 178, this release occurring as indicated at 385 and the gradual return of trigger finger 178 being indicated as at 386.

When trigger fingers 178 and 179 are fully withdrawn or released from arms 163 and 164 as indicated at 387 and 388 respectively, return movement of arms 163 and 164 and selector arms 135 and 142 respectively is caused suddenly as indicated at 389 and 391 by coil springs 177 individual thereto.

Return of the selector arms of course causes the free rotation of the dice reels individual thereto to be suddenly terminated as indicated at 392 and 393. Stopping of the dice reels 84 and 85 is also accompanied by return of the selector switches 292 and 293 individual thereto to their new positions as indicated at 394 and 395. The brushes of selector switches 292 and 293, of course have previously become disengaged from the contacts corresponding to their previous positions as indicated at 396 and 397 during the first initial movement of selector arms 135 and 142 as indicated at 375 and 376.

Switch actuating pin 212 is carried by link 201 and accordingly, follows the initial forward movement thereof as indicated at 367, and shortly after the start of this movement switch 214 is opened thereby as indicated at 398. A short interval after the opening of switch 214 switch 213 opens as indicated at 399. As arm 202 returns to engage stop 205, switch 213 is the first to close as indicated at 401 and shortly thereafter switch 214 closes as indicated at 402. Although the operation of the selector switches 292 and 293 has previously been completed as indicated at 394 and 395, the circuit functions of these switches in the new positions thereof are not completed until switch 214 has closed as indicated at 402, as will become more fully apparent as the description proceeds.

On its return movement, link 201 rides with pin 207 in slot 206 thereof whereby switch actuating pin 212 engages the nub 216 of switch 217, switch 217 being thus momentarily actuated to closed position as indicated at 403.

Figure 13:
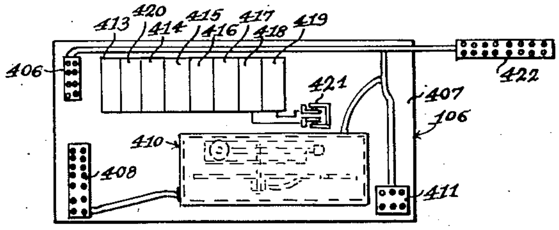
Figure 13 is a plan view of the playing piece counter circuit assembly.

Conductors from the handle control magnet 246, the governor control magnet 218, the selector switches 292 and 293, and switches 211, 213, 214, and 217 are brought out to the terminal plugs 404 and 405, as may best be seen in Figure 7. Plug 405 is receivable into a socket 406 therefor which is mounted on the panel 407 of the counter assembly unit 106, as may best be seen in Figure 13. Also mounted on this panel is a socket 408 which is adapted to receive a plug 409 to which is connected the bank of lamps 86 disposed beneath the table or cover 76, as may best be seen in Figure 3. Still another socket 411 is mounted on panel 407, and this socket is adapted to receive a socket 412 which is connected to the switch 68, the control magnet 62, and winding 73 of the dispenser solenoid, as may best be seen in Figure 5.

Sockets 406 and 411 and 408 are connected to a selector switch generally designated 410, and sockets 406 and 411 additionally are connected to a bank of relays designated 413 to 420 inclusive. Relays 418 and 419 are interconnected by means of a manually controllable bridging type switch 421.

Figure 1:
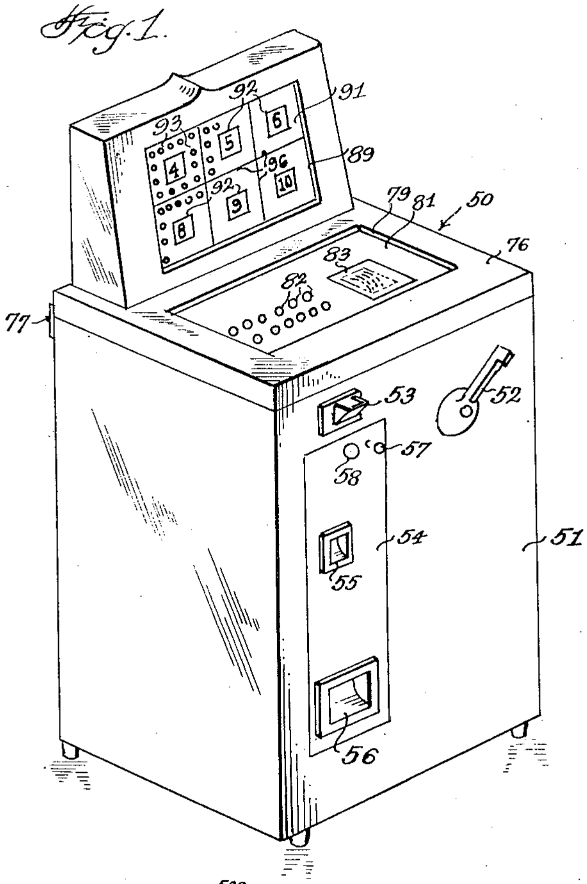
Figure 1 is a view in perspective of a console-type amusement device constructed in accordance with the preferred embodiment of the present invention.
Figure 17:
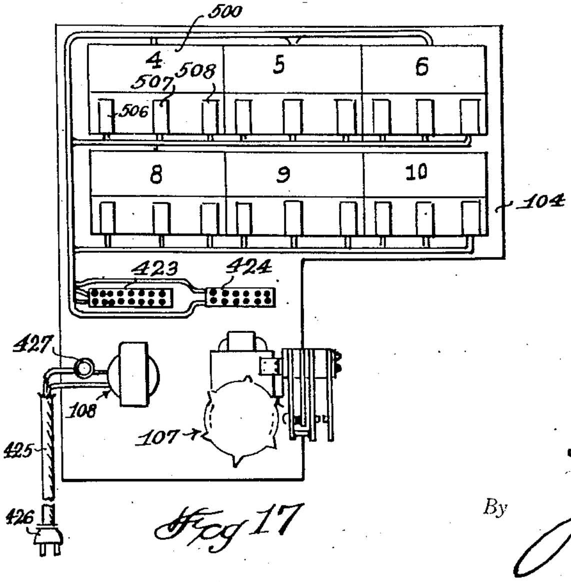
Figure 17 is a plan view of the point counter circuit assembly.

Control unit 106 is connected as by the plug 422 to the socket 423 therefor which is mounted on shelf or panel 104, as may best be seen in Figure 17. Also mounted on this panel is a socket 424 for receiving the plug 404 from reel mechanism 105. It will be seen from this figure that transformer 108 has connected thereto an extension cord 425 terminating in a plug 426 for connection into the usual conventional 110 volt power line, or the like, a suitable fuse being interposed as at 427.

Figures 14, 15, 16:
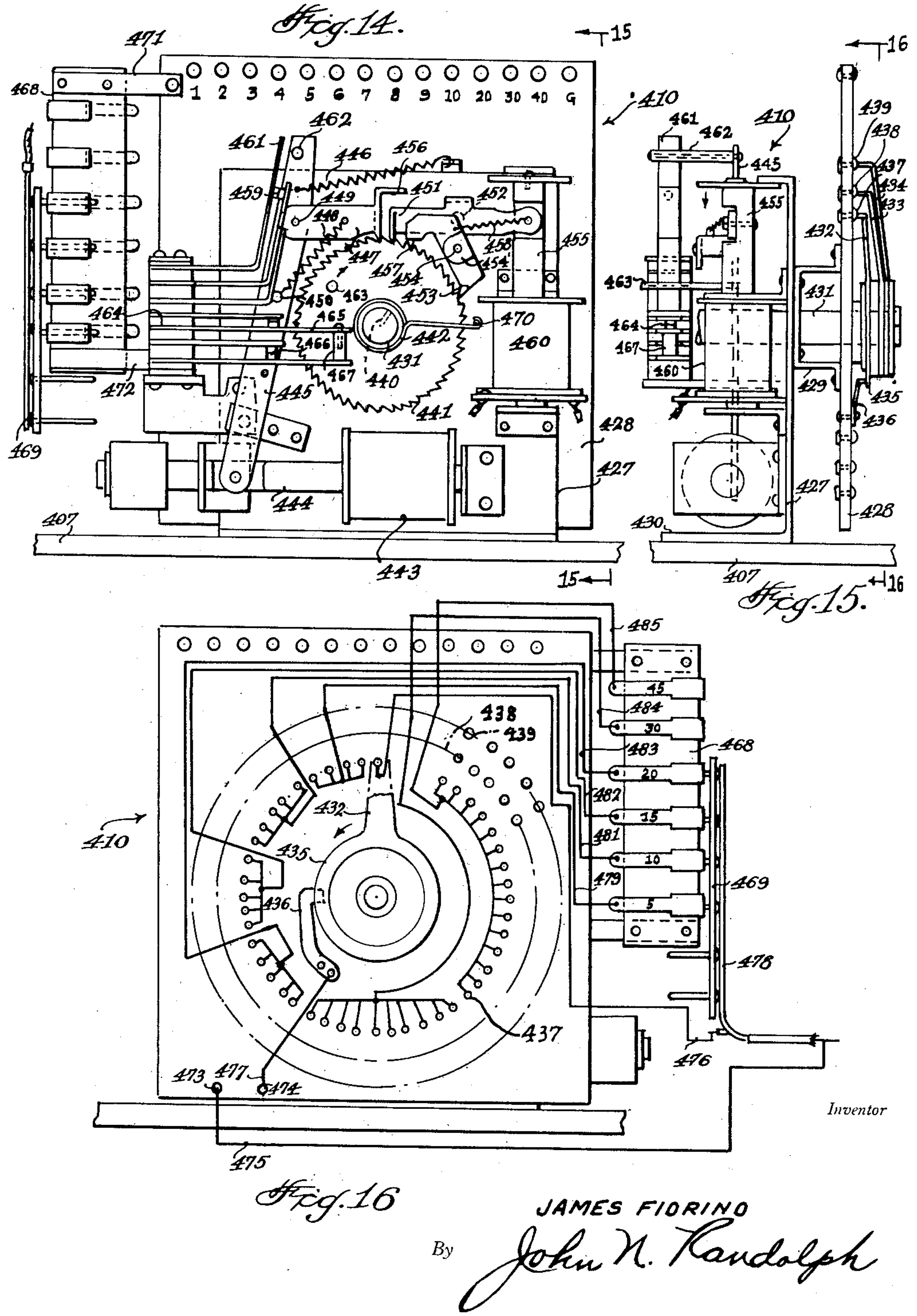
Figure 14 is a view in elevation of the playing piece counter switch mechanism.
Figure 15 is a view in elevation of the playing piece counter switch mechanism as seen along the line 15—15 of Figure 14.
Figure 16 is a view in elevation of the playing piece counter switch mechanism as seen along the line 16—16 of Figure 15.

Attention is now directed to Figures 14 to 16 for a more detailed description of the playing piece counter selector switch 410. This switch is a conventional step-up step-down type of selector switch having a supporting plate 427 having an angularly formed supporting base 430 and a contact panel 428 which is spaced from the plate 427 as by the bracket 429. A shaft 431 is journalled in plate 427 and panel 428 and carries three wipers 432 to 434, wipers 433 and 434 being electrically connected together and to shaft 431 whereas wiper 432 is insulated from the shaft and from the other wipers, as illustrated in Figure 15, wiper 432 having a ring portion 435 which engages a terminal finger 436 which is secured to panel 428. Wipers 432 to 434 respectively engage three rings of contacts designated 437 to 439, these contacts being arranged on panel 428 concentrically with respect to the axis of rotation of shaft 431.

Shaft 431 also carries a ratchet wheel 441 which has as many teeth as there are contacts in each of the aforementioned rings of contacts. Shaft 431 also carries a coil spring 442 which is sleeved thereabout and secured at one end to the shaft as indicated at 440 and at the other end to a pin 470 secured to plate 427, the spring being so wound as to yieldably urge the ratchet wheel 441 counterclockwise as viewed in Figure 14.

A step-up coil 443, when energized, operates through its plunger 444 to rock the lever 445 about the pivot 450 therefor against the opposing force of spring 446 whereby pawl 447 which is pivotally secured to lever 445 as at 449 and urged yieldably into engagement with the ratchet wheel 441 as by the coil spring 448, is caused to ratchet back on the ratchet wheel one tooth thereon. Thus, when coil 443 is de-energized pawl 447 is moved forward under power of spring 446 to move the ratchet wheel 441 forward one tooth, the pawl 451 which is pivotally secured to plate 427 as at 452 being caused to ratchet over the advancing tooth. Similarly, the pawl 453, which is pivotally supported as at 454 within the bracket 454′ secured to pawl 451, is caused to ratchet over the tooth advancing with respect thereto.

The step-down coil 460, when energized, operates through its plunger 455 to rock the pawl 451 which first moves to disengage itself from ratchet wheel 441 and then moves further to engage pawl 447 as at 456 whereupon pawl 447 is lifted and disengaged from the ratchet wheel. Meanwhile, pawl 453 moves counterclockwise with the ratchet wheel under the power stored in spring 442 the distance of one tooth. When coil 460 is de-energized, pawls 447 and 451 drop down to engage the ratchet wheel in its retracted position, and simultaneously, pawl 451 engages the offset portion 457 of pawl 453 whereupon this pawl is kicked out of the retracted tooth and advanced one tooth on the ratchet wheel, pawl 453 all the while being urged into engagement with the ratchet wheel by the spring 458.

By reason of the aforedescribed arrangement of selector switch 410, each time the step-up coil 443 receives an energizing pulse, ratchet wheel 441 is stepped ahead one tooth which also causes the wipers 432 to 434 to advance one contact on their respective contact rings, and each time the step-down coil 460 receives an energizing pulse the ratchet wheel 441 is retracted or withdrawn one tooth whereby the wipers are stepped back one contact on their respective contact rings.

Selector switch 410 is arranged to be stepped ahead on self-interrupted pulses, this being accomplished by energizing the step-up coil 443 through the switch contact 459 having an extended spring leaf portion 461 arranged to be engaged by a pin 462 carried by lever 445 whereby the contacts 459 are opened as the lever is driven by plunger 444 to ratchet the pawl 447 back on the ratchet wheel 441 to engage the next preceding tooth thereon. Thus, with constant energization supplied to step-up coil 443, the energizing circuit thereto is broken or interrupted as pin 462 moves back to open contacts 459 whereupon pawl 447 advances the ratchet wheel under power of spring 446. This, however, closes the energizing circuit again through switch contacts 459 and the ratchet wheel is again advanced, and this cycle is repeated as long as energy is supplied to coil 443, thus causing the selector switch to advance on self-interrupted or self-generated pulses.

Ratchet wheel 441 carries a pin 463 which is so arranged thereon as to engage the extended leaf spring of a pair of contacts 464 as at 465 when the wipers 432 to 434 are fully retracted with respect to their contact banks, i. e., the wipers are in their "home positions." Contacts 466 which are connected to contacts 464 as at 467 also are opened as pin 463 moves to the home position of selector switch 410.

Wiper 432 and its coacting ring of contacts 437 together with the multi-socket 468 which is secured to contact panel 428 as at 471 and 472 and the multi-pronged plug 469 comprise a playing piece limit switch which, when opened, de-energizes the control magnet 62 whereupon a playing piece deposited into the amusement device 50 is rejected therefrom by way of the rejector slot 55. To this end, the contacts of contact ring 437 are arranged in groups corresponding to the different positions of plug 469 in socket 468.

When wiper 432 is in the home position of selector switch 410, the limit switch is closed, the circuit between the terminals 473 and 474, Figure 16, being completed through the switch, this circuit being traced as follows: From terminal 473 by way of conductor 475, conductor 476, contact 1 of contact ring 437, wiper 432, terminal finger 436, and thence by way of conductor 477 back to terminal 474. When wiper 432 is advanced to contact 2 of contact ring 437 when a coin is deposited into the device, the circuit between terminals 473 and 474 is broken, thereby to limit operation of the device to a single playing piece, provided, however, that plug 469 has been completely removed from socket 468.

The prongs of plug 469 are all electrically connected to conductor 478 which is connected to conductor 475. When only one prong of plug 469 is inserted into the socket terminal designated 5 of multi-socket 468, terminal 473 of the limit switch is connected by way of conductor 475, conductor 478, the prong of plug 469, socket terminal 5 of multi-socket 468 by way of conductor 479 to contacts 2, 3, 4 and 5 of contact ring 437, these contacts all being connected together electrically. Consequently, when wiper 432 is resting in engagement with any one of these contacts, the circuit between terminals 473 and 474 is closed and the limit switch therefor is closed and remains closed until wiper 432 moves into engagement with contact 6. Thus, in this position of plug 469 and multi-socket 468, the limit switch is adjusted to take up to five playing pieces. When two prongs of plug 469 are inserted in socket terminals designated 5 and 10 of multi-socket 468, the switch is set to accept ten playing pieces before the switch is opened, the circuit between terminals 473 and 474 being closed by the conductor 481 which interconnects socket terminal 10 with contacts 6 to 10 of contact ring 437. Similarly, when three prongs of plug 469 are inserted respectively in socket terminals 5, 10 and 15, the switch is set to accept fifteen playing pieces, the circuit between terminals 473 and 474 being interrupted to open the limit switch as wiper 432 moves into engagement with contact 16. In like manner, socket terminals 20, 30 and 45 are respectively connected as by conductors 483, 484 and 485 to the groups of interconnected contacts 16 to 20, 21 to 30, and 31 to 45 whereby the limit switch is set to accept as many as twenty, thirty, or forty-five playing pieces selectively in accordance with the number of successive socket terminals of socket 468 which have been engaged by the prongs of plug 469 and in accordance with the extent to which wiper 432 has advanced on its coacting contact ring 437.

Figure 18:
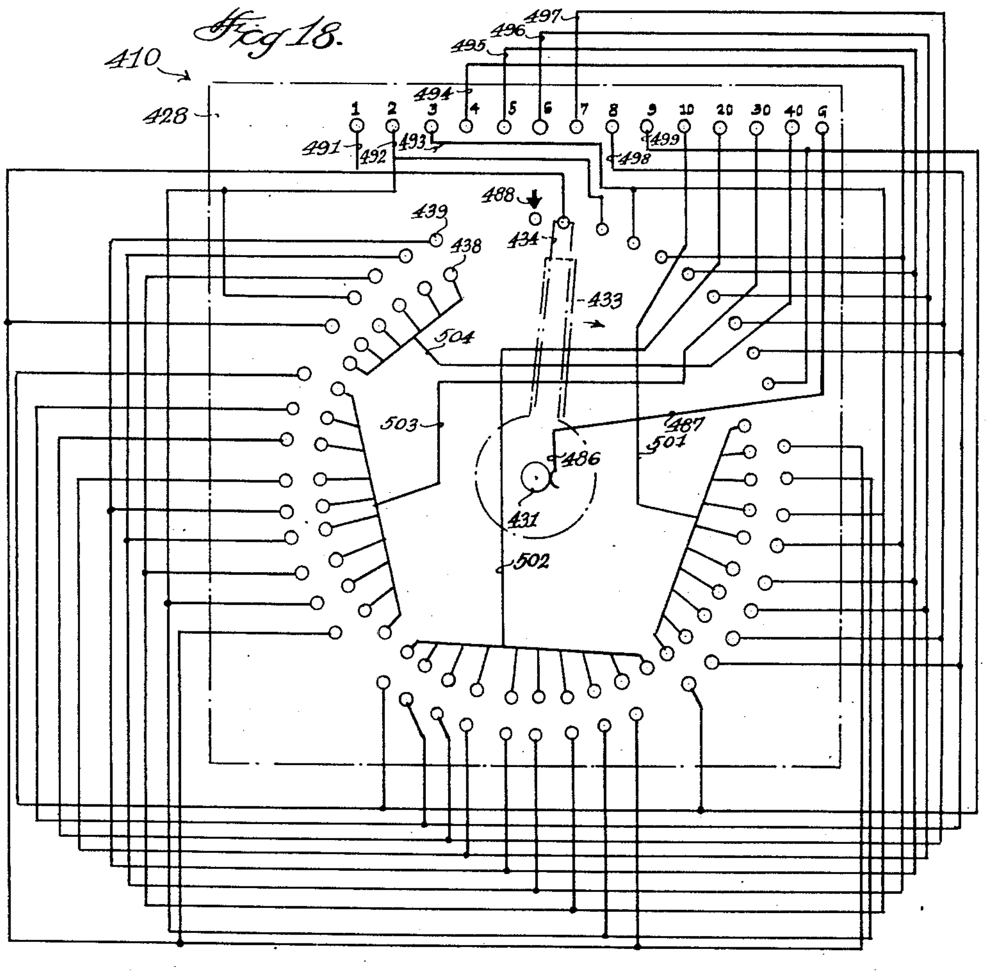
Figure 18 is a diagrammatic view of the electrical arrangement of the wipers and contacts of the switch counters as employed for use in controlling the lighting of the various lamps employed in the device of the present invention.

Wipers 433 and 434 and their associated contact rings 438 and 439 are employed to control the lighting circuit for the bank of lamps 86 mounted beneath the table or cover 76. To this end, wipers 433 and 434 which are electrically connected to shaft 431 are connected by the spring finger 486 and conductor 487 to the ground terminal designated G, on the contact panel 428, as may best be seen in Figure 18. In this figure, the wipers 433 and 434 are shown advanced one contact from home position of the switch, home position in the case of contact rings 438 and 439 being when the wipers 433 and 434 rest in engagement with contacts which are blank, that is to say, contacts which have no electrical connections thereto. This home position is indicated by the arrow designated 488, rotation of the wipers 433 and 434 as viewed in Figure 18 being clockwise and the wipers being shown in engagement with contact 1 of their respective contact rings 438 and 439.

As counted clockwise from the home or zero position 488, the first nine contacts of contact ring 439 are connected respectively as by conductors 491 to 499 to the contact terminals designated 1 to 9 on contact panel 428. The tenth contact in contact ring 439 is left blank, and the next nine contacts also being connected by conductors 491 to 499 to contact terminals 1 to 9 respectively. In like manner, the twentieth, thirtieth and fortieth terminals of contact ring 439 are left blank, and the groups of nine contacts lying respectively therebetween are also connected as by conductors 491 to 499 to terminals 1 to 9, respectively. The forty-first to forty-fifth contacts of ring 439 also are connected as by conductors 491 to 495 respectively, to terminals 1 to 5, this fifth group of contacts being limited to five contacts for the reason that, it will be recalled, the limit switch comprising wiper 432 and contact ring 437 is limited to accept a maximum of forty-five playing pieces.

The tenth through the nineteenth contact of contact ring 438 are connected together and by conductor 501 to terminal 10 on contact panel 428, wiper 433 thus being in engagement with the tenth contact of its associated contact ring when wiper 434 is in engagement with the blank tenth contact of its associated contact ring. The circuits which are completed in successive order from terminal G to terminals 1 to 9 as wiper 434 is advanced over the first nine contacts of contact ring 439 are completed again in successive order from terminal G to terminals 1 to 9 as wiper 434 is advanced over the eleventh to nineteenth contacts on its associated contact bank. Concurrently therewith, wiper 433 advances over the eleventh to nineteenth contacts on its associated contact bank to complete a circuit from terminal G to terminal 10. In like manner, contacts 20 to 29, contacts 30 to 39, and contacts 40 to 45 of contact ring 438, which are connected as by conductors 502 to 504 respectively to terminals 20, 30, and 40 are effective to complete circuits between terminal G and terminals 20, 30 and 40 as wiper 433 passes in successive order over these groups of contacts. Concurrently therewith, terminal G is connected in successive order to terminals 1 to 9 as wiper 434 advances over the successive groups of contacts 21 to 29, 31 to 39, and 41 to 49 of contact ring 439 the twenty-first, thirty-first, and forty-first and succeeding contacts of contact ring 439 also being connected to terminal G as wiper 433 engages the twenty-first, thirty-first, and forty-first and succeeding contacts of contact ring 439.

Figure 19:
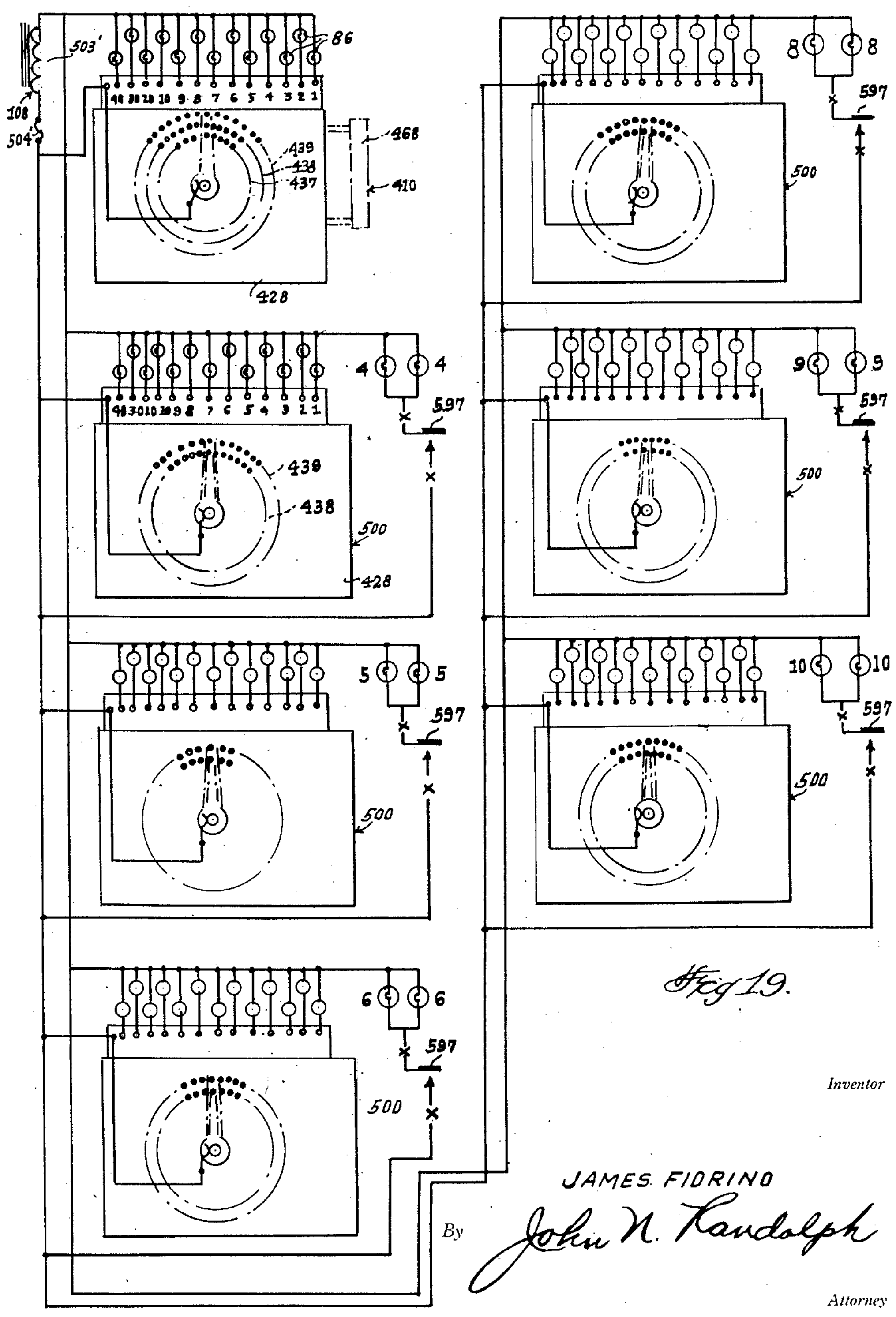
Figure 19 is a diagrammatic view of the electrical system for lighting the lamps.

By reason of the aforedescribed arrangement of wipers 433 and 434 and their associated contact banks 438 and 439, lamps numbered 1 to 9 on the cover or table 76 are caused to be lighted in successive order as wipers 433 and 434 advance over the first nine contacts in their respective rings, the energy for this purpose being supplied from the six volt secondary winding 503′ of transformer 108, a suitable fuse 504′ preferably being employed in the obvious series circuit for each of the lamps illustrated in Figure 19. When circuits are completed by switch 410 in successive order to the lamps designated 10, 20, 30 and 40, these lamps are lighted individually, and when the playing piece selector switch has completed circuits corresponding to numbers intermediate these tenths numbers, the lamp corresponding to the particular unit number is lighted along with the lamp corresponding to the tenths numbers whereby the two lighted lamps together indicate the two digit numbers which, for example, may be 25 in which case the number 20 lamp is lighted and the number 5 lamp is also lighted.

The aforementioned point counter assembly units designated 4, 5, 6, 8, 9, and 10 illustrated in Figure 17 also each comprises a selector switch which is designated 500 and is generally similar to the selector switch 410 of the counter assembly unit 106. The selector switches for the point counted unit however, do not employ the aforedescribed playing piece limit switch. These switches also do not operate on self-generated pulses and, therefore the aforedescribed interruptor switch 459 is not employed with these switches. In lieu thereof, however, the point selector switches do employ a third pair of contacts 505 which are adapted to be operated along with contacts 464 and 466 when engaged by or disengaged from pin 463 carried by ratchet wheel 441.

The similarity between the lamp lighting circuits as controlled by the playing piece selector switch and as controlled by the point selector switches is illustrated in Figure 19. The lamp lighting circuits for the point lamp assemblies, however, also include the lamps designated by the point numbers in Figure 19, these lamps being connected across secondary winding 503′ as the make switch of a control relay therefor is closed, in a manner more fully to be described as the description proceeds. Each point assembly unit includes this control relay which is designated 507 and two additional control relays designated 506 and 508.

Reference is now made to Figure 21*b* wherein further details of the motor and cam assembly 107 are illustrated diagrammatically. The motor comprises any suitable self-starting synchronous motor or constant speed induction motor having a core 509 upon which is wound an actuating winding designated 511. The motor armature 512, when winding 511 is deenergized, is urged out of alignment with core 509 as illustrated, as by gravity, or suitable spring means, as in a well known manner. When winding 511 is energized, armature 512 is drawn into alignment with the core by solenoid action therebetween whereby the separable parts of clutch 513 are brought into engagement with each other, in a well known manner, thereby to connect armature 512 to the input of the gear reduction 514, one part of clutch 513 being connected to the armature 512 for rotation therewith and the other part of the clutch being connected to the gear train in a manner to form a driving connection therewith, all in accordance with well known practice. The self-operating clutching action of armature 512 is desired in order to prevent overrunning of the cam discs 515 and 516 which are secured to the output end of gear reduction 514 for rotation therewith, when winding 511 has become de-energized. In the absence of such a clutching action, the flywheel effect of armature 512 might be sufficient to advance the cam disc 516 rotationally through an angle which exceeds the angle comprehended by the peripheral notches 517 formed in the cam discs. In such case, the cam follower 518 would rise out of the notch 517 and close the switch 519 which cooperates with the cam disc 516 to provide a carry-over operation of the motor so that the cam follower 521 cooperatively associated with cam disc 515 will not come to rest with the cam follower 521 astride one of the plurality of cam protuberances 522 arranged in spaced relation about the periphery of cam disc 515. When the cam follower 521 is engaged by the cam protuberances 522, a pair of switches 523 and 524 are closed thereby. Switches 523 and 524 serve to supply operating pulses to the dispenser solenoid 73 and the selector switches of the counter assembly unit 106 and of the point assembly units 4, 5, 6 and 8 to 10, as the discs 515 and 516 rotate. Obviously, therefore, these pulses must not be supplied by the motor assembly unit 107 until the winding 511 has been energized in a manner subsequently to appear.

The manner in which the various plays are made on the amusement device will now be described with particular reference being made to Figures 20 and 21*a*, *b* and *c*.

When the plug 426 is inserted into the outlet of a conventional 110 volt power supply line, the primary winding 525 of transformer 108 is energized whereupon the six volt secondary winding 503′ (Figure 19) and the secondary winding 526 (Figure 21*a*) which supplies 50 volts, are inductively excited. When this occurs, a circuit for energizing the governor control magnet 218 from secondary winding 526 is completed by way of a fuse 527, conductor 528, switch 211, a conductor 532, winding of governor control magnet 218, and thence by way of conductor 531 back to the other side of secondary winding 526. Armature 219 then moves to pull the stop 221 from the path of rotation of impeller blade 197 of governor 196. A circuit is also completed from the secondary winding 526 for energizing the control magnet 62, this circuit being traced by way of fuse 527, conductor 528, switch 211, conductor 532, switch 213, conductor 529, armature and break contact 533 of relay 416, conductor 534, armature and break contact 535 of relay 415, conductor 536, break contact 537 and armature of relay 418, conductor 538, terminal 473, conductor 475, conductor 476, contact 1 of contact ring 437, wiper 432, terminal finger 436, conductor 477, terminal 474, conductor 539, winding of electromagnet 62, and thence by way of conductor 531 to the other side of secondary winding 526. As the electromagnet 62 is energized the armature thereof moves finger 65 into opening 66 and the amusement device 50 is now ready to receive a playing piece designated 541, Figure 21*a*.

As playing piece 541 passes between finger 65 and leaf spring 67 of switch 68, switch 68 is closed and a circuit for energizing relay 419 is completed thereto, this circuit being traced as follows: From potential on conductor 529 by way of switch 68, conductor 542, break contact 543 and leaf spring of contact 544 of relay 419, and thence by way of the winding of relay 419 to potential on conductor 531. Contact 543 is a part of a make-before-break contact combination whereby, as relay 419 is energized, a lock in circuit is completed thereto, this circuit being traced as follows: From potential on conductor 528 by way of armature and make contact 544 of relay 419, and thence by way of the relay winding to potential on conductor 531. Energization of relay 419 is now maintained continuously until the plug 426 is pulled out of the power outlet. Accordingly, relay 418 which is energized only through the break contact 545 and armature of relay 419 cannot be energized until relay 419 becomes de-energized. Relay 418 cannot be energized through contact 545, however, unless the winding of relay 418 has first been connected by way of conductor 546 to potential on conductor 531. This is accomplished under conditions hereinafter to appear when the anti-cheat feature of the present invention is described.

As switch 68 closes momentarily as playing piece 541 passes thereby, relay 416 is also energized, one side of the winding of this relay having the potential on conductor 542 applied thereto and the other side of the winding having the potential of conductor 531 applied thereto. As relay 416 operates, a locked in circuit is completed thereto by way of potential on conductor 529, armature and make contact 547 of relay 416, interruptor switch 459 of selector switch 410, conductor 542, and thence by way of winding of relay 416 to potential on conductor 531. As relay 416 operates, a circuit is also completed to step-up coil 443 of selector switch 410 by way of potential on conductor 529, armature and make contact 548 of relay 416, conductor 549, and thence by way of step-up coil 443 to potential on conductor 531. As plunger 444 moves in response to energization of step-up coil 443, lever 445 is moved thereby to pick up a tooth of ratchet wheel 441 and concurrently therewith pin 462 carried thereby moves to open the interruptor switch 459 whereupon the circuit for energizing relay 416 is interrupted and the relay is de-energized. As relay 416 releases, the circuit through make contact 548 thereof for energizing step-up coil 443 is interrupted and step-up coil 443 is de-energized whereupon lever 445 carries ratchet wheel 441 forward one step and wipers 432, 433 and 434 advance one contact on their respective contact rings.

With wiper 434 resting on contact 1, lamp number one on cover 76 is lighted, and with wiper 432 resting on contact 2, the circuit between terminals 473 and 474 is completed by way of conductor 479 whereupon energization of the control magnet 62 is continued for the next four steps of selector switch 410 after which the control magnet 62 will be de-energized and the sixth playing piece will be rejected, one prong of plug 469 being in engagement with socket terminal number five of multi-socket 468. It will be apparent, that each of the second, third, fourth and fifth playing pieces will cause the same sequential operation and release of relay 416 and step-up magnet of selector switch 410 as was caused as aforedescribed by the first playing piece to be received, whereby the wipers of the selector switch are advanced one contact for each of the playing pieces so received. It will be understood, that while the limit of playing pieces receivable has been set at five as illustrated in Figure 21*a*, this is merely for purposes of illustration, as it will be recalled that plug 469 and socket 468 may be so engaged as to extend the limit to forty-five playing pieces.

As ratchet wheel 441 of selector switch 410 advances on the first step thereof, pin 463 carried by the wheel withdraws from engagement with switches 466 and 464 whereupon these switches are closed and remain closed until pin 463 again moves into engagement therewith when the ratchet wheel 441 is returned to its home position. As switch 466 closes, a circuit is completed for energizing the handle control magnet 246 by way of potential on conductor 532, switches 213 and 214, conductor 551, winding of handle control magnet 246, conductor 552, break contact 553 and armature of relay 417, conductor 546, and thence by way of switch 466 to potential on conductor 531. As handle control magnet 246 operates, latch 251 is moved thereby to lock the arm 248 of pawl 241 whereby the handle 52 is now free to move the reel mechanism through a cycle of operations, as aforedescribed.

As handle 52 is rocked and returned, free and independent rotation is imparted to each of the dice reels, and this free rotation is continued until the rollers 131 each move into one of the six slots 147 provided therefor in the slotted disk 132 associated with the dice reel individual thereto, the dice reels being stopped by their respective rollers in time delayed sequential order and concurrently therewith selector switches 292 and 293 each moves to a position on its contact banks in accordance with the depth of the slot engaged by its associated roller 131 and in accordance with the symbol or number indicated opposite the reference mark 97 and corresponding to this particular rotational stop position of the reel individual thereto.

Let it be assumed that reel 84 stops at number six whereupon selector switch 292 is in position 6 thereof, and let it further be assumed that reel 85 has stopped at number five whereupon selector switch 293 is in position 5 thereof. In such case, the reels together indicate the combination 11, and the selector switches 292 and 293 additively produce the circuit function 11, that is to say, potential on conductor 529 is applied by way of terminal F, Figure 20, brushes 299 and 298 and contacts 6 of contact rows 303 and 302, conductor 339, fifth contact of contact row 315, brush 319, conductor 327, brush 333, eighth contact from the right of contact row 336, and thence by way of conductor 554 to terminal 11. This results in operation of the dispensing mechanism. Let it be assumed, by way of example, that four playing pieces had been deposited, in which case, lamp number four on cover 76 will be lighted and the number four, indicating four playing pieces, will be registered on the machine.

With potential on terminal eleven, Figure 20, a circuit is completed by way of conductor 555 to the make contact 556 of relay 414, Figure 21*a*. As potential is applied via conductor 555, relay 414 is operated, whereby contact 556 is closed, for the reason that relays 415 and 414 were operated in sequence in response to momentary closure of switch 217 upon engagement thereby with pin 212 during the return movement of link 201.

When switch 217 closed, a circuit for energizing relay 415 was completed by way of potential on conductor 532, switch 217, conductor 557, break contact 558 of relay 415 in contact with the leaf spring of make contact 559 of the relay, winding of relay 415, conductor 561, and thence by way of switch 464 of selector switch 410 to potential on conductor 531. As relay 415 operates, a locked-in circuit is completed thereto by way of potential on conductor 528, armature and make contact 559 of the make-before-break combination 559, 558 of relay 415 whereby potential is maintained across the relay to maintain the energization thereof. As relay 415 operates, a circuit is completed by way of its make contact 562 for energizing relay 414, this circuit being traced from potential on conductor 529 when switch 213 closes in time delayed sequence to the momentary closure of switch 217, to break contact 563 and armature of relay 508 of the point 10 assembly unit, Figure 21*c*, conductor 564 to the break contact 563 and armature of relay 508 of the point 9 assembly unit, conductor 565 to the break contact 563 and armature of relay 508 of the point 8 assembly unit, conductor 566 to the break contact 563 and armature of relay 508 of the point 6 assembly unit, conductor 567 to the break contact 563 and armature of relay 508 of the point 5 assembly unit, conductor 568 to break contact 563 and armature of relay 508 of the point 4 assembly unit thence by way of conductor 569 to the winding of relay 414, conductor 571 to make contact 562 of relay 415, and thence by way of make contact 562 and armature of the relay to potential on conductor 531.

From the foregoing, it should now be apparent that when the reels stop on the combination eleven and when relays 415 and 414 have been actuated in sequence during the roll of the reels, make contact 556 of relay 414 will be in engagement with its cooperating armature whereby a circuit is completed from potential on conductor 572 to the winding of dispenser control relay 420, the other side of which is connected to potential on conductor 531 whereupon the relay 420 is energized. This relay preferably is mounted on the panel 407 of the control assembly unit 106, Figure 13. As relay 420 operates, a circuit is completed by way of potential on conductor 528, armature and make contact 573 of the control relay 420, and thence by way of conductor 574 to winding 511 of motor and cam assembly 107, the other side of winding 511 being connected to potential on conductor 531 whereupon the motor operates to drive the cam disks 515 and 516, as aforedescribed. Potential for operating winding 511 of the motor is also supplied independently of dispenser control relay 420 by way of potential on conductor 528, armature and make contact 575 of relay 414, conductor 574, and thence by way of winding 511 to potential on conductor 531. This assures resetting of selector or switch 410, in a manner presently to be described, in the event that reels 84 and 85 had stopped in positions simulating any one of the combinations 2, 3 and 12, it being recalled that output terminals 2, 3 and 12 of selector switch 293 have no external circuit connections and hence no external circuit functions are initiated by the series connection affected by selector switches 292 and 293 when this series connection serves only to connect terminal F with any one of output terminals 2, 3 and 12 of selector switch 293. Thus, when the reels stop on any of the combinations 2, 3 and 12, selector switch 410 is reset, the playing pieces deposited in the amusement device are retained therein, the device is restored to its initial unoperated condition, and at least one additional playing piece must be deposited into the amusement device to unlock the handle for further play.

As cam disk 515 rotates, cam protuberances 522 engage the cam follower 521 whereupon switches 523 and 524 are momentarily closed each time a protuberance engages the cam follower 521. Pulses of power, or current are supplied by switch 523 each time it closes, and these pulses are supplied by way of potential on conductor 528, switch 523, conductor 576, armature and make contact 577 of relay 414, conductor 578, and thence by way of step-down coil 460 of selector switch 410, the other side of step-down coil 460 being connected to potential on conductor 531 whereby the step-down coil is energized and plunger 455 is operated to release ratchet wheel 441 for a one tooth return movement as plunger 455 moves back when the pulse has subsided. For each current pulse thus received by step-down coil 460, ratchet wheel 441 is moved back a tooth and wipers 432 to 434 are stepped back step-by-step to their initial positions whereupon switches 464 and 466 are opened.

Concurrently with the step-down operation of selector switch 410, current pulses are also received by the winding 73 of the dispenser solenoid, these pulses being supplied by way of potential on plug 426, fuse 427, winding 73, make contact 580 and armature of dispenser control relay 420, conductor 579, switch 524, and thence by way of conductor 581 to the other side of plug 426. In response to this current pulse received by windings 73 of the dispenser solenoid, the solenoid operates to expose the discharge end of tube 71 to make dispensings therefrom as aforedescribed for each pulse supplied to the solenoid winding 73, there being four such pulses received in the case of the aforementioned assumed example of four playing pieces having been deposited in the machine and, in which case, four pulses were required by step-down coil 460 of selector switch 410 in order to restore the wipers thereof to home positions. As wiper 434 is moved away from contact 4, lamp number four on the table which has been illuminated is now extinguished, and lamps 3, 2, and 1, are thereafter lighted and extinguished in the order named as wiper 434 moves in successive order over contacts 3, 2 and 1 to its home position, these lamps having been lighted and extinguished in the reverse order in response to the successive deposit of the four playing pieces into the machine.

As switch 464 of the selector switch 410 is opened, the circuit therethrough for energizing relay 415 is interrupted whereupon this relay is released, thereby to interrupt the circuit through armature and make-contact 562 of the relay for energizing relay 414 which thus, in turn, releases. As relay 414 releases, make contact 556 of the relay is disengaged from its cooperating armature whereupon the afore traced circuit for energizing the control relay 420 is interrupted and this relay accordingly is released. As relays 414 and 420 release, the circuits completed through their respective contacts 575 and 573 for energizing the winding 511 of the motor and cam assembly 107 are interrupted whereby energization of the motor is discontinued. As the motor is de-energized, clutch 513 is disengaged whereupon the disks 515 and 516 are brought substantially to an instantaneous stop. If, however, disk 515 has stopped with a protuberance 522 in engagement with the cam follower 521 such that the switches 523 and 524 are closed, cam follower 518 will not be in either of cam grooves 517 in the disk and, accordingly, a circuit will be completed to winding 511 for energizing the motor from potential on conductor 528 by way of switch 519, and thence by way of conductor 574 to winding 511, the other side of the winding being connected to potential on conductor 531 whereupon operation of the motor is continued until the cam follower 518 drops into one of the peripheral notches or grooves 517 to thereby completely de-energize the motor.

To recapitulate, except for the dispensing function effected by the external circuitry connected to output terminal 11 of selector switch 293 when the reels stop in positions simulating the combination 11, as just described, the operation of the amusement device is the same for combination 11 as for any of the combinations 2, 3 and 12. Stated otherwise, if the external circuit to output terminal 11 were disconnected therefrom, the operation of the machine would be the same for all of combinations 2, 3, 11 and 12.

With the exception of anti-cheat relay 419 which, it will be recalled, has been locked in across potential on conductors 528 and 531 through its own make contact 544, the other circuit components and the reel mechanism have been restored to their initial positions. By way of further illustration it will now be assumed that five playing pieces are deposited into the machine and the dice reels have been rolled and stopped in positions five and two of dice reels 84 and 85 respectively, whereby selector switches 292 and 293 are at rest in their fifth and second positions respectively, the dice reels thus collectively indicating the dice combination "seven." This being the case, potential is applied to terminal 7, Figure 20, by way of potential on conductor 529, terminal F, contact ring 303, brush 299, conductor 301, brush 298, fifth contact of contact ring 302, conductor 582, contact row 314, brush 318, conductor 326, brush 332 in engagement with the fifth contact of contact row 335, and thence by way of conductor 338 to terminal seven. The manner in which circuits are controlled from potential on this terminal for the aforementioned five playing pieces deposited in the machine, will now be described, lamp number five on the table being illuminated thereby to indicate and register the fact that five playing pieces have been deposited.

During the roll of the dice reels which has caused the dice combination seven to appear on the machine, as before, relay 415 is energized as switch 217 closes momentarily during the return movement of link 201, and thereafter, relay 414 closes as switch 213 is closed just prior to the completion of the cycle of operation of the reel mechanism 105. Under these conditions, a circuit is completed by way of potential on terminal 7, Figure 20, by way of conductor 583, winding of relay 413, conductor 584, and thence by way of armature and make contact 585 of relay 415 to potential on conductor 531 whereupon relay 413, Figure 21*b*, is energized.

As relay 413 operates, potential on conductor 583 is applied by way of make contact 586 and armature of relay 413, conductor 555, make contact 556 and armature of relay 414, conductor 572, and thence by way of the winding of the control relay 420 to potential on conductor 531 whereupon relay 420 is operated. As relay 413 operates, potential on conductor 528 is applied by way of armature and make contact 587 of the relay, and thence by way of conductor 574 to winding 511 of the motor cam assembly 107 whereupon the motor and cam disks 515 and 516 are set in operation. Potential on conductor 528 is also applied by way of armature and make contact 573 of relay 420, and thence by way of conductor 574 to the motor winding. In addition to these circuits, as aforementioned, potential is also applied to the motor winding from potential on conductor 528 by way of armature and make contact 575 of relay 414, and thence by way of conductor 574 to the motor winding.

As the motor operates, pulses are supplied, as aforedescribed, from potential on conductor 528 by way of switch 523 of the motor and cam assembly, conductor 576, armature and make contact 577 of relay 414 and thence by way of conductor 578 to the step-down coil 460 of selector switch 410 whereupon the selector switch is stepped back one step for each pulse supplied thereto from the motor and cam assembly unit, five such pulses being required in order to re-set the selector switch 410 to its home position, it being recalled that, by way of example, five playing pieces had been deposited in the machine as indicated by the lighted lamp number five on the cover or table of the device. For each of the five pulses thus applied to the selector switch 410, a pulse is supplied as aforedescribed, from potential on conductor 581 by way of switch 524 of the motor and cam assembly, conductor 579, armature and make contact 580 of relay 420, winding 73 of the dispenser solenoid, and thence by way of fuse 427 to the other side of plug 426 whereupon the dispenser solenoid is operated as aforedescribed for each of the five pulses.

The current pulses, of course, cease after the fifth pulse for the reason that selector switch 410 is now re-set in its home position and the energizing circuit to relay 415 is interrupted at switch 464 of selector switch 410, relay 414 is released in sequence as relay 415 releases, and the control relay 420 is released as relay 414 releases, all in the manner previously traced in detail. Having described the manner in which operation of the machine is accomplished on number combination seven, the manner in which the machine operates under another situation will now be described.

Let it be assumed by way of example that dice reels 84 and 85 each stop on position two thereof whereby the symbol 2 is indicated by each of the reels and the reels collectively indicate the point four. In such case selector switches 292 and 293 are each in position two thereof and potential is applied by way of conductor 528 on one side of secondary winding 526 of transformer 108 and thence by way of switches 211, 213 and 214 to conductor 529 which is connected to terminal F of selector switch 292 whereupon potential is applied by way of contact row 303, brush 299, conductor 301, brush 298, in contact with contact 2 of row 302, terminal two of switch 292, conductor 588, contact row 309, brush 311, conductor 323, brush 329 in contact with the second contact of contact row 335, and thence by way of conductor 589 to terminal four on selector switch 293. Potential on terminal four is applied by way of conductor 591 to the armature and break contact 592 of relay 507, Figure 21*c*, thence by way of winding of relay 506, to conductor 571 which is connected to contact 562 of relay 415 which is operated during the roll of the dice reels in turning up point four, three playing pieces, for example, having been deposited in the machine and this number being registered by lighted lamp number three on the table or cover of the device. Relay 415 being operated, the aforedescribed circuit from relay 506 is thus completed by way of make contact 562 and armature of relay 415 to potential on conductor 531.

As relay 506 operates, a circuit for simultaneously energizing the step-down coil of selector switch 410 and the step-up coil of selector switch 500 of the point four assembly unit is completed by way of make contact 593 and armature of relay 506, this circuit being traced from potential on conductor 528 by way of switch 523 of the motor and cam assembly 107, conductor 576, armature and make contact 577 of relay 414, conductor 578, and thence by way of step-down coil 460 of selector switch 410 in parallel with the series combination of contact 593 and armature of relay 506 and step-up coil 443 of point four selector switch 500 to potential on conductor 531 whereupon selector switch 410 is stepped back to home position and point four selector switch 500 is advanced to contact 3 on its contact ring 439 whereby the lights on the table are extinguished and the number three lamp in the square area 92 for point four on the upright panel 88 is lighted. The point four lamp, however, is not lighted until relay 507 of the point four assembly is operated as switch 217 closes momentarily during the subsequent roll of the reels.

As switch 217 closes momentarily, potential on conductor 557 is applied by way of break contact 694 and spring leaf of make contact 695 of relay 507, winding of this relay, and thence by way of switch 464 of the point four selector switch 500 to potential on conductor 531 whereby relay 507 is operated. It will be understood, that switches 464, 466 and 505 of the point four selector switch 500 are closed as the ratchet wheel 441 of the switch advances away from the home position thereof in the same manner as previously described for selector switch 410. It will also be understood, that the pulse producing motor or generator 107 was energized from conductor 528 by way of armature and make contact 575 of relay 414 and conductor 574 as relay 414 was operated, as in an aforedescribed manner, to supply the aforementioned current pulses concurrently to the step-down and step-up coils respectively of selector switches 410 and 500 of the point four unit assembly.

As relay 507 operates, a locked-in circuit is completed thereto by way of potential on conductor 528 and armature and make contact 695 of the relay to the winding thereof, the other end of the winding being maintained by way of switch 464 to potential on conductor 531. The armature and make contact 597 of relay 507 also close as the relay operates to connect the number four lamps of the point four unit assembly across transformer 503′ whereby these lamps are lighted, reference being made to Figure 19, which illustrates the details of the lamp lighting circuit.

Contacts 592 and 598 of relay 507 constitute a break-make combination which switches conductor 591 which is connected to terminal four of selector switch 293 from the winding of relay 506 to the winding of relay 508 as relay 507 operates, thereby to place the point four unit assembly in readiness for actuation of the dispensing mechanism in the event that the dice reels should again stop on point four, a condition which will be described more fully hereinafter. For the present, let it be assumed that the dice reels have stopped so as to position selector switch 292 in position three thereof and selector switch 293 in position four thereof whereby the switches additively complete a circuit to terminal 7 of switch 293, this circuit being traced by way of potential on conductor 529, terminal F, contact row 303, brush 299, conductor 301, brush 298 in engagement with contact 3, terminal 3, conductor 599, contact row 312, brush 316, conductor 324, brush 330 in engagement with the fourth contact from the right of contact row 336, and thence by way of conductor 338 to terminal 7 of switch 293. Potential on conductor 583 is applied to the winding of relay 413, the other side of the winding being completed by way of conductor 584 and the armature and make contact 601 of relay 507 to potential on conductor 531 whereupon relay 413 is operated.

As relay 413 operates, potential on conductor 528 is applied by way of armature and make contact 587 of relay 413 and thence by way of conductor 574 to the winding 511 of the pulse motor whereupon current pulses are supplied by way of potential on conductor 528, switch 523 of the motor and cam mechanism 107, and thence by way of conductor 576, armature and make contact 602 of relay 413, conductor 603, break contact 604 and armature of relay 508 of the point four assembly, conductor 605, step-down winding 460 of point four selector switch 500, and thence by way of switch contact 505 of this selector switch to potential on conductor 531 whereby pulses are supplied to the selector switch to return the same to its home position, three such pulses being required, assuming that three playing pieces had been deposited on the number four.

Let it be assumed further by way of illustration that two playing pieces had been deposited just prior to the last mentioned roll of the reels. In such case, the table or cover lamps would indicate and register this deposit by means of the lamp associated with the number corresponding to the last total displayed by the reels, lamp three in the area of point 4 on the upright panel 88 being lighted to register the previous triple deposit in association with the number four combination.

Under these conditions, the selector switch 410 will be advanced two contacts and relays 415 and 414 and the pulse generator will be operated in sequence as switches 211, 217, 213 and 214 of the reel mechanism close in sequence during the cycle of operations of the mechanism. Thus, when the dice reels stop on number seven, the point four selector switch is restored to its home position, as aforedescribed, but the control relay 420 is operated as the circuit is completed thereto by way of potential on conductor 583, make contact 586 and armature of relay 413, conductor 555, make contact 556 and armature of relay 414, conductor 572, and thence by way of winding of control relay 420 to potential on conductor 531. Under these conditions, two pulses are received by winding 73 of the dispenser solenoid from the pulse generator 107 as pulses concurrently therewith are supplied to the step-down coils of selector switches 410 and 500 of the point four assembly unit.

It will be understood, of course, that if any numerical combination other than four or seven is turned up on the reels in the situation as just previously described, there will be no circuit closed thereby effective to change the operating conditions initially set up by the roll of point four on the device, handle control magnet 246, however, being energized by way of conductor 546 by reason of the fact that the opportunity still exists to revolve the reels until either the numerical combination four or seven appears thereon, selector switch assembly 500 of the point four assembly unit still being advanced from its home position. Under these conditions, the cycle of operations of the reel mechanism may be repeated over and over again until the reels either turn up the point four or the combination seven, as aforedescribed. Of course, it will be understood, that one or more other deposits may be made into the machine and, under such conditions, additional points may be set up and registered on the device and a completion of play on any of these points as well as on point eleven if that is turned up, may be completed in the event that any of these points turn up on the reels prior to the appearance thereon of the number combination seven.

Assuming again that the point four combination has been rolled up on the reels just subsequent to a deposit of three playing pieces, the number three lamp on the table will be lighted prior to the roll of the reels and the lamp will be extinguished during the roll of the reels and in lieu thereof lamp number three in the point four area on panel 88 will be lighted to record the play on the point combination 4, this transfer having been effected by switch contact 593 of relay 506 of the point four unit assembly as the selector switches 292 and 293 cooperated additively to apply potential on terminal 4 of selector switch 293 whereby potential on the terminal is applied by way of conductor 591 to the break-make combination 592, 598 of relay 507 of the point four unit assembly. As aforementioned, during the subsequent roll of the reels in trying to make point four, conductor 591 is transferred from relay 506 to relay 508 whereby the point four unit assembly is in readiness to operate the control relay 420 and pulse generator 107 in sequence in the event that point combination four is again turned up on the dice reels. Assuming that this occurs, and until it occurs it being understood that potential on conductor 591 is removed therefrom during retraction of the reel selector switches as the reels rotate, potential is again applied by way of conductor 591 to armature and contact 598 of relay 507 and to the winding of relay 508 whereby the relay is operated, point lamp number four on panel 88 also having been lighted upon operation of relay 507 when switch 217 closed during the last mentioned roll of the dice reels.

As relay 508 operates, potential on conductor 528 is applied by way of armature and make contact 610 of relay 508, and thence by way of conductor 572 to the winding of control relay 420 whereby this relay is operated and potential on conductor 528 is applied by way of armature and make contact 573 of relay 420 and thence by way of conductor 574 to winding 511 of the pulse generator 107, thereby also setting the pulse generator in operation. As the pulse generator operates, current pulses are supplied by way of potential on conductor 528, switch 523 of pulse generator 107, conductor 576, make contact 600 and armature of relay 508, conductor 605, step-down winding 460 of the point four selector switch 500 and thence by way of switch 505 of this selector switch to potential on conductor 531 whereby the selector switch is stepped back one step for each pulse received, there being three such pulses required to restore the switch to its home position, corresponding to the last mentioned deposit. For each pulse thus supplied to selector switch 500 of the point four assembly, a pulse is supplied to the winding 73 of the dispensing solenoid, the pulses supplied from the pulse generator 107 terminating with the third pulse for the reason that relay 507 is de-energized as selector switch 500 of the point four unit assembly opened as the switch was restored to zero or home position. As relay 507 is de-energized, relay 508 is released thereby and control relay 420 and pulse generator 107, in turn, are de-energized as relay 508 releases, thereby terminating the play and re-setting the device for further plays.

Let it be assumed again that the combination four appears immediately after three playing pieces have been deposited. Let it further be assumed that, prior to the second roll of the reels, five playing pieces are deposited into the device.

Let it be assumed again that the dice reels again turn up the point combination four whereupon potential on conductor 591 causes the aforedescribed operation resulting from pulses supplied to the winding 73 and also causes the point four selector switch 500 to be reset to zero position. Under such conditions, however, relay 414 which would have been energized upon closure of switch 213 of the reel mechanism, is not operated in the presently assumed situation resulting from the recurrence of the point four combination on the reels until relay 507 of the point four unit has first released, it being recalled that the circuit for energizing relay 414 is traced through break contact 563 and armature of relay 508 with the result that the circuit is not completed through contact 563 until relay 508 is released following release of relay 507. When this is accomplished, however, relays 506 and 414 are again effective to transfer the indication or registry of the last deposit on the recurring point four combination from the table to the panel 88 in the area occupied by the point four lamps. The circuits of the amusement device are now in the same operational condition as when the reels turn up the point combination four after an initial release of the machine for operation.

Assuming the point played for to be four, let it further be assumed by way of illustration, that the dice reels turn up the point combination five on the next roll of the reels. In such case, although potential is applied by way of conductor 529, terminal F, contact row 303, brush 299, conductor 301, brush 298 in engagement with contact 4 of contact row 302, terminal 4 of switch 292, conductor 604, contact row 313, brush 317, conductor 325, brush 331 in engagement with the fourth contact from the right of contact row 334, and thence by way of conductor 605 to terminal 5 of switch 293 and thence by way of conductor 606, the armature and break contact of the relay of the point five unit assembly which corresponds to armature and break contact 592 of relay 507 of the point four unit assembly, and thence to the winding of relay 506 of this assembly, the relay nevertheless is not operated for the reason that the circuit is not completed therefrom through contact 562 of relay 415. This last named relay, of course, is not operated for the reason that no deposit was made into the machine just prior to this roll of the reels which turned up the point combination five. The condition of the circuits therefore is unaffected or unchanged by the roll of the point five combination on the reels, and the reels may again be rolled to try again for the point four combination.

The combination point four still being the point tried for, let it now be assumed that a four units deposit is made into the device whereupon the number four is illuminated on the table or cover of the device, and let it be assumed further on the next roll of the reels that the point combination eleven is turned up thereby. Under such conditions, potential appears on conductor 555, in the manner aforedescribed, and a circuit for energizing the control relay 420 is completed through armature and contact 556 of relay 414, this relay being closed during the roll of the reels, as aforedescribed. As relays 414 and 420 operate, the pulse generator 107 is set into operation and, consequently, the winding 73 receives four pulses in the same manner as heretofore described, the setting of the selector switch 500 of the point four unit assembly, however, retaining its advanced position on contact 3 for the reason that relay 508 has not become operated by the appearance of the number combination eleven. Assuming a playing piece is now deposited and registered on the device by the lighting of lamp one on the table thereof. Let it further be assumed that the reels are rolled and now turn up the dice combination six whereupon potential on conductor 529 is applied by way of selector switch 292 in position three thereof, conductor 599, contact row 312 of switch 293, brush 316, conductor 324, brush 330 in engagement with the third contact from the right of contact row 336 and thence by way of conductor 607 to terminal 6, potential on terminal 6 being applied by way of conductor 608 to the point six unit assembly whereupon registry of the one unit deposit on the table is transferred to the point 6 area on panel 88 so that lamp 1 in this area is illuminated and selector switch 500 of the point six unit assembly is advanced one contact to cause this illumination of the lamp. If, on the next roll of the reels, after other deposits have been made and the reels stop on point six, there will be a pulse supplied to the winding 73 for the previous one unit deposit and point six will again be set up on the device, the number corresponding to the amount last deposited in the machine and which will appear in the point six area on panel 88, and without disturbing the point 4 as indicated in the point area on panel 88. The indication of the point six in the point six area on panel 88, however, will not appear by lighting of lamp 6 until the following roll of the dice reels for the reason that the point six selector switch will first be reset to zero position whereupon relay 507 of the point six unit assembly will be de-energized and cannot again be energized until the reel mechanism switch 217 momentarily closes on the following roll of the reels. Of course, if no further deposit had been made just prior to the last mentioned roll of the reels, namely, the roll which produced recurrence of the point six on the reels, the winding 73 merely would have received a single impulse after which point four would be the only point being played for on the device. In either case, let it now be assumed that the number combination seven turns up on the following roll of the reels whereupon the play on the device is terminated until an additional deposit is made to again permit operation of the machine to set up a new point on the device.

Each time potential is set up on conductor 574 from transformer potential on conductor 528 as when relays 413, 414 and 420 operate, relay 417 is operated to break the circuit at contact 553 of relay 417 to the handle control magnet 246 which insures that the handle 52 will not be free to operate the reel mechanism during the period that impulses are being received by winding 73 or upon play termination operation of the device.

Another feature of the aforedescribed circuit arrangement resides in the provision for delaying lighting of the point lamps on panel 88 until the following roll of the dice reels although the point being played for has already been turned up by the dice reels as evidenced by the registry of the lighted lamp in the point area on the panel 88 having a number corresponding to the number of playing pieces just previously deposited. This lighting sequence in the point area has the advantage of disproving any claims of improper operation of the device. This follows from the fact that although the dice reels indicate the desired point to be played for, the fact that the point lamp is not lighted stands as clear proof of the fact that the dice reels have not as yet been rolled in a try to make that point.

Another feature of the aforedescribed circuit arrangement resides in the provision for preventing spurious operations of the circuit in the event that the plug 426 is pulled out of the power outlet. The operation which follows such act has been referred to hereinbefore as the anti-cheat operation, and this operation will now be described.

*Anti-cheat operation*

Assume, for example, that the selector switch 410 or one or more of the point selector switches 500 have been advanced during plays of the device and, assume further, that the plug 426 is now withdrawn from the outlet. Under such conditions, relay 419 which, as aforedescribed, has been locked in across the secondary transformer winding 526, i. e., between conductors 528 and 531, is now de-energized. When the plug is again inserted into the outlet, relay 418 is energized by way of potential on conductor 528, armature and break contact 545 of relay 419, switch 421, winding of relay 418, conductor 546, and thence by way of switch 466 of selector switch 410, for example, or by way of switch 466 of selector switch 500, for example, and thence to ground potential on conductor 531 whereby relay 418 is operated.

As relay 418 operates, the circuit for energizing the control magnet 62 is interrupted at contact 537 of relay 418 with the result that the device will not receive playing pieces to operate the device at this time. Potential on conductor 528 is also applied by way of armature and make contact 609 of relay 418 to conductor 574 whereby the pulse generator 107 is set into operation, and current pulses supplied thereby through switch 523 thereof are supplied by way of conductor 576 and armature and make contact 611 of relay 418 and thence by way of conductor 603 to the various point assembly units for ressetting the selector switches thereof, the current pulses also being supplied by way of armature and make contact 612 of relay 418 and thence by way of conductor 578 to stepdown coil 460 of selector switch 410 whereby this switch is reset to zero or home position. When the selector switches are restored to their home positions, the circuit to relay 418 is interrupted and the relay is released whereupon the circuits of the device are restored to an initially un-operated condition wherein relay 419 is not operated until the first playing piece has been deposited into the device, as aforedescribed.

*Non-dispensing operation*

By removing one of the layers of the solenoid, the amount dispensed from the machine at each operation of said solenoid is reduced by one-half. Also, the multi-pronged plug 469 of the playing piece limit switch is withdrawn from the multi-socket 468 whereby the limit switch is set to accept only one playing piece deposited into the device. Under these conditions, the aforedescribed manner of operation of the device for the various plays described is the same, it still being possible to make a single unit deposit between each roll of the reels.

Whereas in the foregoing, various mechanisms and circuit arrangements have been disclosed which cooperate to provide an amusement device which is well suited for the purpose of fulfilling the aforestated object of the invention, it will be understood that these have been disclosed for purposes of illustration and are not to be taken in a limiting sense, as other mechanisms and circuit arrangements will occur to those skilled in the art without departing from the spirit and scope of the invention as defined by the claims appended hereto.

What is desired to be secured by Letters Patent of the United States is:

1. In a device of the character disclosed, the combination of a pair of freely rotatable members each having a plurality of numbered rotational stop positions, a pair of selector switches individual to said members and each having a brush and a plurality of contacts corresponding respectively to the stop positions of the members individual thereto, means operatively connected to said members and to said brushes respectively for setting the brushes in positions of engagement with contacts corresponding to said stop positions of the members when the same are stopped in said positions, a plurality of numbered output terminals, circuit means connecting said engaged brushes and contacts in series for each pair of stop positions of the members and to the one of said output terminals having a number equal to the sum of the numbers of each said pair of stop positions, and a plurality of control circuits for said plurality of stop positions of the members, each of said control circuits being connected to one of said output terminals and including said selector switches connected in series therein for operation thereby as the switches are closed when the members are stopped during a period of rotation and the brushes of the switches are set in the positions corresponding to the stopped positions of the members.

2. In a device of the character disclosed, the combination of a pair of freely rotatable members each having a plurality of numbered rotational stop positions, a pair of selector switches individual to said members and each having a brush selectively engageable with each of a plurality of contacts corresponding respectively to the stop positions of the member individual thereto, means individual to said members and switches for setting the brushes of the switches in positions of engagement with said contacts corresponding to the stopped positions of the members when the members have been stopped during a period of free rotation, a plurality of numbered output terminals, circuit means connecting said engaged brushes and contacts in series for each pair of stop positions of the members and to the one of said output terminals having a number equal to the sum of the numbers of each said pair of stop positions, and a control circuit being connected to one of said output terminals and for each of said set positions of the brushes of the selector switches, said circuit having said brushes connected in series therein for operating the circuit as the switches are set in position when rotation of the members is stopped.

3. In a device of the character disclosed, the combination of a pair of freely rotatable members, means individual to said members for imparting free rotary movement thereto simultaneously, a pair of selector switches individual to said members and each having a brush and a plurality of contacts selectively engageable by the brush, means rendered effective during said rotation of the members and individual thereto and to said switches for stopping the members fortuitously in any one of a plurality of numbered rotational positions and for concurrently setting the brushes of the switches in one of a plurality of positions of engagement with contacts corresponding to the stopped positions of the members individual thereto, a plurality of numbered output terminals, circuit means connecting said engaged brushes and contacts in series for each pair of stop positions of the members and to the one of said output terminals having a number equal to the sum of the numbers of each said pair of stop positions, and a control circuit for each of said set positions of the brushes of the selector switches, said circuit being connected to one of said output terminals and including said switches connected in series therein for operating the circuit as the brushes of the switches are set in position when rotation of the members is stopped.

4. In a device of the character disclosed, the combination of a pair of freely rotatable members, a pair of slotted discs carried respectively by said members for rotation therewith, each said disc having a plurality of peripheral slots of different numbered depths arranged in random order about the disc, a pair of multi-position selector switches, means including a pair of arms individual to said members and receivable into the slots of said discs for imparting free rotary motion to the members as said arms are withdrawn suddenly from said slots, means operable in time delayed relation to initiation of rotation of said members and including a second pair of arms receivable respectively into said slots of the discs and operatively connected to said switches respectively for stopping the members by movement of said second pair of arms into the slots in the discs, said switches having a plurality of contacts corresponding to predetermined positions thereof and brushes connected to said second pair of arms and movable thereby to engage one of the contacts selectively in accordance with the numbered depths of the slots engaged, a plurality of numbered output terminals, circuit means connecting said engaged brushes and contacts in series for each pair of stop positions of the members and to the one of said output terminals having a number equal to the sum of the numbers of the slots effecting each said pair of stop positions, and a control circuit for each of said predetermined positions of the switches, said circuit being connected to one of said output terminals and including said switches connected in series therein for operating the circuit as the switches are set in position when rotation of the members is stopped.

5. In a device of the character disclosed, the combination of a pair of freely rotatable members each having a plurality of dice symbols displayed thereon and arranged thereabout, a pair of slotted discs individual to said members and secured thereto for rotation therewith, said discs having a plurality of peripheral slots corresponding to said symbols on the member individual thereto and said slots being of different numbered depths in accordance with the numerals represented by said symbols, a pair of selector switches individual to said members and each having a plurality of circuit closing positions corresponding respectively to the symbols displayed on the members individual thereto, means including a pair of arms individual to said discs and receivable into said slots of the discs for imparting rotary motion to the members as said arms are withdrawn suddenly from the slots, a time measuring device, means including a manually manipulatable handle for moving said arms into said slots and for setting said time measuring device in operation as said arms are withdrawn from the discs, means controlled by said time measuring device and including a second pair of arms individual to said discs and receivable into the slots thereof respectively for stopping the discs by moving said last named arms into the slots thereof in time delayed sequential order as the time measuring means operates, said switches having contacts corresponding to said predetermined positions of the switches and brushes connected to said second arms and movable thereby to engage one of the contacts selectively in accordance with the numbered depths of the slots engaged, a plurality of numbered output terminals, circuit means connecting said engaged brushes and contacts in series for each pair of stop positions of said members and discs and to the one of said output terminals having a number equal to the sum of the numbers of the slots effecting each said pair of stop positions, and a control circuit for each of said predetermined positions of the switches, said circuit being connected to one of said output terminals and including the switches in series connection therein for operating the circuit when the switches are closed in sequence as rotation of the members is stopped in sequential order.

6. In an amusement device of the character disclosed, the combination of a pair of reels mounted side by side for free rotary motion independently of each other, each of said reels having a plurality of dice symbols displayed thereon and arranged thereabout in random fashion, indicia means disposed between said reels and providing a reference mark for identifying the symbols disposed on opposite sides thereof, said oppositely disposed symbols additively displaying a plurality of dice combination numbers as different dice symbols are moved into reference relation with respect to said mark, a pair of slotted discs carried respectively by said reels for rotation therewith, each of said discs having a plurality of peripheral slots corresponding respectively to the symbols on the reel individual thereto, said slots having different depths in accordance with the magnitude of the dice symbols corresponding thereto, a first selector switch having a plurality of contacts and a pole selectively engageable therewith, arm means connected to the pole of the switch and receivable into the slots of one of the discs so that the pole is set in positions of engagement with different numbered ones of said plurality of contacts thereof selectively in accordance with the depth of the slot received by the arm means, a second selector switch having a plurality of rows of contacts and a plurality of poles individual to said rows, and engageable selectively with the contacts thereof, second arm means connected to the poles of said second switch and receivable into the slots of the other of said discs so that the poles are set in positions of engagement with different numbered ones of the contacts of the rows individual thereto selectively in accordance with the depth of the slot received by the second arm means, said contacts of said first switch being connected to said poles of the second switch, and a plurality of terminals having numbers corresponding respectively to said dice combination numbers, predetermined ones of said rows of contacts being connected electrically together and to predetermined ones of said terminals whereby a circuit is completed from said first named pole to each of said terminals selectively when the dice combination number corresponding thereto is equal to the sum of the switch position numbers corresponding to the instantaneous positions of rest of the poles of the respective switches.

7. The combination as claimed in claim 6, said rows of contacts of the second switch comprising three rows of nine contacts each and each of said rows of nine contacts having two of said plurality of poles arranged for cooperation therewith and spaced from each other along the row by two intermediate contacts whereby two contacts in each row of nine contacts are engaged in successive order by the two poles individual thereto as the second switch is moved through the plurality of positions thereof.

8. In a device of the character disclosed, the combination of a pair of reels mounted for free rotation independently of each other, means including a normally locked manually manipulatable handle for imparting rotation to said reels when the handle is released for operation, means individual to said reels for stopping the same and selectively in a plurality of different numbered rotational chance stop positions, a plurality of numbered control circuits corresponding respectively to said rotational stop positions, switch means individual to said stopping means and operated thereby for operating said control circuits selectively in accordance with the instantaneous stop positions of the reels, each of said circuits having said switch means connected in series therein to close the circuit when the reels stop in positions having numbers whose sum equals the number of the circuit, means including an electromagnet for releasing said handle when the electromagnet is energized, and means controlled by said circuits and including a normally open switch for energizing said electromagnet when the switch is closed, each of a pair of said control circuits having means for releasing the electromagnet when the reels stop in the positions corresponding thereto, the remaining control circuits each having means for releasing the electromagnet when the reels stop a second time in the positions individual thereto prior to the operation of one of said pair of control circuits.

9. In a device of the character disclosed, the combination of a pair of reels mounted for free rotation independently of each other, means for imparting rotation to said reels, means individual to the reels for stopping the same in time delayed sequential order and selectively in a plurality of different numbered rotational chance stop positions, a plurality of control circuits corresponding respectively to said rotational stop positions, switch means individual to said stopping means and operated thereby for operating said control circuits selectively in accordance with the instantaneous stop positions of the reels, each of said circuits having said switch means connected in series therein to close the circuit when the reels stop in positions having numbers whose sum equals the number of the circuit, and an electroresponsive device controlled by said circuits, each of a pair of said circuits having means for operating said electroresponsive device when the reels stop in positions corresponding thereto, each of the remaining circuits having means for operating said electroresponsive device when the reels stop twice in the positions individual thereto, one of said pair of circuits having means for preventing operation of said eletroresponsive device by said remaining circuits when said one of the circuits is operated following the first operation of any one of said remaining circuits.

10. In a device of the character disclosed, the combination of a pair of reels mounted for free rotation independently of each other, means including a normally locked manually manipulatable handle for imparting rotation to said reels when the handle is released for operation, means individual to said reels for stopping the same in time delayed sequential order and selectively in a plurality of different numbered chance stop positions, a plurality of numbered control circuits corresponding respectively to said rotational stop positions, selector switch means individual to said stopping means and operated thereby for operating said control circuits selectively in accordance with the instantaneous stop positions of the reels, each of said circuits having said switch means connected in series therein to close the circuit when the reels stop in positions having numbers whose sum equals the number of the circuit, means including an electromagnet for releasing said handle when the electromagnet is energized, means controlled by said circuits and including a normally open switch for energizing the electromagnet when the switch is closed, and an electroresponsive device controlled by said circuits, each of a pair of said circuits having means for simultaneously releasing said electromagnet and operating said electroresponsive device when the reels stop in positions individual thereto, each of the remaining circuits having means for simultaneously releasing the electromagnet and operating the electroresponsive device when the reels stop twice in the positions individual thereto, one of said pair of circuits having means for releasing said handle following the first operation of any one of said remaining circuits whereby successive operation thereof is prevented until said switch is again closed.

11. A device as claimed in claim 10 and having a playing piece controlled device for closing said switch when a playing piece is received thereby.

12. In a device of the character disclosed, the combination of a pair of freely rotatable reels having a plurality of different chance stop positions, means individual to said reels for stopping the same in time delayed sequential order during a period of free rotation, a pair of multi-position selector switches operatively connected to said stopping means respectively and adjusted thereby to different numbered stop positions selectively in accordance with the instantaneous stop positions of the reels, conductor means for connecting said switches in series for each of the positions thereof, a plurality of numbered control circuits corresponding respectively to the positions of said selector switches and each having said switches connected in series therewith in stop positions having numbers whose sum equals the number of the circuit whereby the circuits are closed selectively by said switches, and an electroresponsive device controlled by said circuits, each of a pair of said circuits having means for operating said electroresponsive device when the circuit is closed, each of the remaining circuits having means for operating the electroresponsive device when the circuit is operated a second time prior to the closing of one of said pair of circuits.

13. In a device of the character disclosed, the combination of a pair of freely rotatable reels each having a series of dice symbols carried thereby and arranged in random fashion thereabout, each of said reels having a plurality of stop positions corresponding to said symbols, a reference mark for displaying pairs of said symbols on the reels in each of said stop positions thereof, means individual to said reels for stopping the same during a period of free rotation, a pair of multi-position selector switches operatively connected to said stopping means respectively and adjusted thereby to different positions selectively in accordance with the instantaneous stop positions of the reels, a bank of lamps having associated numerals serially numbered in accordance with the sum of the symbols collectively displayed on the reels, a power source for said lamps, a plurality of relays individual to said lamps and having switch means for connecting the lamps to said source of power to light the same when the relays are energized, a second source, and conductor means for connecting said switches in series to said second source and to one of said relays selectively for each of the positions of the switches, said switches being connected so that the relays selectively connected thereto in the different switch positions light lamps each of which displays a lighted numeral equal to the sum of the symbols displayed with reference to said mark.

14. In a device of the character disclosed, the combination of a pair of freely rotatable reels each having a plurality of dice symbols displayed thereon in random fashion thereabout, each of said reels having a plurality of different positions in which it may be stopped by chance during a period of free rotation, means providing a reference mark for displaying pairs of symbols on said reels collectively in the different stop positions thereof, a plurality of numbered circuits, switch means operatively connected to said reels and adjustable thereby to different positions selectively in accordance with the instantaneous stop positions of the reels for closing said circuits selectively in accordance with the matching relation between the numbers of the circuits and the sums of said pairs of symbols collectively displayed with reference to said mark, and means controlled by a closed one of said circuits and effective during a succeeding period of rotation of the reels for recording and displaying a numeral corresponding to the sum of symbols previously displayed by the reels in reference to said mark just prior to said succeeding period of rotation.

15. A device of the character disclosed comprising a pair of freely rotatable reels each having a plurality of dice symbols displayed thereon and arranged in random fashion thereabout, means including a normally locked handle for imparting rotation to the reels upon operation of the handle when the same is released, means for stopping the reels in different positions of rotation corresponding to said symbols thereon, a reference mark for indicating pairs of said symbols of the reels in the different stopped positions thereof, a plurality of control circuits switch means operatively connected to said stopping means of said reels respectively and adjustable thereby to different positions selectively in accordance with the instantaneous stop positions of the reels for closing said circuits selectively in accordance with the sums of the symbols indicated by said mark, means including an electromagnet for releasing said handle when the electromagnet is energized, a playing piece controlled device including a switch for energizing the electromagnet as the switch is closed when a playing piece is received by the device, means including a first stepper switch operable on self generated pulses for maintaining the energization of the electromagnet, means operable on closing of said switch for stepping the stepper switch, a first bank of numbered lamps, means including said stepper switch for lighting said lamps selectively in accordance with the number of playing pieces received by said playing piece control device prior to operation of the handle, a plurality of stepper switches for said plurality of control circuits respectively, a pulse generator controlled by said circuits and adapted to be operated thereby as each of the circuits is closed, a plurality of banks of lamps individual to said last named stepper switches and numbered in accordance with said first bank of lamps, said stepper switches having means responsive to pulses supplied thereto by said pulse generator for restoring said stepper switches to their initial positions and advancing said plurality of stepper switches step by step for each pulse received thereby, each of said circuits having means for causing said generator to supply said pulses to said first selector switch to restore the same to initial position and for simultaneously causing the generator to supply the same number of pulses for advancing the selector switch individual thereto whereby a lamp having the same number as the lamp previously lighted by said first selector switch is lighted in the bank of lamps individual to the circuit closed, a plurality of point lamps individual to said banks of lamps and to said control circuits and numbered in accordance with said sums of symbols displayed on the reels, and means individual to each of said control circuits for lighting said point lamp individual thereto during the next succeeding roll of the reels following that which turned up the sum of the symbols individual thereto.

16. An amusement device comprising a cabinet, a reel mechanism having a pair of freely rotatable dice indicia bearing reels mounted for display at the top of the table of different pairs of dice symbols turned up by chance as the reels are stopped suddenly during periods of free rotation, means including a normally locked handle for operating the mechanism when the handle is released, a lamp panel on the top of the cabinet, a second lamp panel disposed upright on the cabinet, means including a playing piece controlled device for releasing said handle when a playing piece is received and for lighting one of a plurality of lamps on the first panel having a number corresponding to the number of playing pieces received prior to operation of the handle, a plurality of banks of lamps on said second panel numbered in accordance with the numbering of the lamps on the first panel and each including a point lamp numbered in accordance with the sum of one of said different pairs of dice symbols, means controlled by the reel mechanism during the first period of rotation of the reels following release of said handle for lighting a lamp in one of said banks of lamps having a number corresponding to the lamp lighted on the top of the cabinet and simultaneously extinguishing said last named lamp, said one of the banks of lamps having a point lamp numbered in accordance with the sum of the dice symbols displayed by the reels at the termination of said first period of rotation, and means controlled by the reel mechanism during the succeeding period of rotation thereof for lighting said last mentioned point lamp.

17. An amusement device comprising a cabinet, a reel mechanism mounted in the cabinet and comprising a pair of freely rotatable dice reels and means including a normally locked handle for imparting free rotation to the reels when the handle is released and operated, a bank of numbered lamps displayed on top of the cabinet, an upright panel on the cabinet, a plurality of groups of numbered lamps on said panel each having a plurality of lamps numbered in accordance with said lamps on the top of the cabinet and including a point lamp numbered in accordance with the sum of one of a plurality of different pairs of dice symbols displayed by the reels, means including a playing pieces controlled device for releasing said handle when a playing pieces is received thereby and lighting the lamp of said bank of lamps having a number corresponding to the number of playing pieces received prior to operation of the handle, means controlled by the reel mechanism for simultaneously extinguishing said lighted one of the lamps and lighting a correspondingly numbered one of the lamps in the one of said groups of lamps having a point lamp numbered in accordance with the sum of the dice symbols displayed by the reels at the termination of a first period of rotation thereof, means controlled by the reel mechanism for lighting said last named point lamp during the succeeding period of rotation of the reels, a dispensing device, and means controlled by the reel mechanism for simultaneously operating said dispensing device and extinguishing the lamps on the panel when said sum of the dice symbols is displayed by the reels at the termination of a subsequent period of rotation thereof, or selectively extinguishing said panel lamps when the reels collectively display the combination seven at the termination of a subsequent period of rotation and prior to recurrence of said sum of the dice symbols thereon.

18. An amusement device comprising a cabinet, a reel mechanism mounted in the cabinet and comprising a pair of freely rotatable dice reels and means including a normally locked handle for imparting free rotation to the reels when the handle is released and operated, a bank of consecutively numbered lamps displayed on the top of the cabinet, and upright panel on the cabinet, a plurality of groups of consecutively numbered lamps on said panel each having a plurality of lamps numbered in accordance with said lamps on the top of the cabinet and including a point lamp numbered in accordance with the sum of one of a plurality of different pairs of dice symbols displayed by the reels, means including a playing piece controlled device for releasing said handle when a playing piece is received thereby and consecutively lighting the lamps of said bank of lamps until a lamp is lighted having a number corresponding to the number of playing pieces received prior to operation of the handle, means including a limit switch for limiting the number of playing pieces receivable by said playing piece controlled device, a dispensing device, an impulse generator, means controlled by the reel mechanism and including said impulse generator for extinguishing said cabinet lamps in reverse order and simultaneously operating said dispensing device in a series of operations by pulses received from said generator when the dice reels collectively display either dice combination seven or eleven at the termination of a first period of rotation of the reels following release of the handle, means controlled by the reel mechanism and including said pulse generator for consecutively extinguishing said cabinet lamps in response to pulses received from the generator and simultaneously and consecutively lighting the lamps in the group of panel lamps having a point lamp corresponding to the number displayed collectively by the reels at the termination of said first period of rotation thereof whereby the number of playing pieces played thereon is registered by a panel lamp having a corresponding number when the dice reels collectively display one of dice combinations four, five, six, eight, nine and ten at the termination of the first period of rotation of the reels, means controlled by the reel mechanism for lighting said last named point lamp during the succeeding period of rotation of the reels, and means controlled by the reel mechanism and including the pulse generator for extinguishing said lighted panel lamps in reverse order and simultaneously operating said dispensing device in a series of operations by pulses received from the generator when the dice reels collectively display said one of the dice combinations four, five, six, eight, nine and ten at the termination of said succeeding period of rotation.

References Cited in the file of this patent

UNITED STATES PATENTS

| | | |
|---|---|---|
| 2,157,266 | Lamica | May 9, 1939 |
| 2,171,295 | Shultz | Aug. 29, 1939 |
| 2,205,471 | Fagerholm | June 25, 1940 |
| 2,579,241 | Nicolaus | Dec. 18, 1951 |
| 2,665,914 | Nicolaus | Jan. 12, 1954 |
| 2,693,962 | Stevens | Nov. 9, 1954 |